United States Patent
Yamashita et al.

(10) Patent No.: US 8,959,940 B2
(45) Date of Patent: Feb. 24, 2015

(54) REFRIGERATION CYCLE APPARATUS

(75) Inventors: Koji Yamashita, Tokyo (JP); Hiroyuki Morimoto, Tokyo (JP); Takeshi Hatomura, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 334 days.

(21) Appl. No.: 13/576,358

(22) PCT Filed: Feb. 12, 2010

(86) PCT No.: PCT/JP2010/000863
§ 371 (c)(1),
(2), (4) Date: Jul. 31, 2012

(87) PCT Pub. No.: WO2011/099074
PCT Pub. Date: Aug. 18, 2011

(65) Prior Publication Data
US 2012/0297804 A1     Nov. 29, 2012

(51) Int. Cl.
*F25B 49/02*    (2006.01)

(52) U.S. Cl.
USPC ............... 62/207; 62/222; 62/228.4

(58) Field of Classification Search
CPC ............ F25B 49/022; F25B 2309/06; F25B 2309/061; F25B 2313/0313; F25B 2313/0315; F25B 2600/025; F25B 2600/2513; F25B 2700/171; F25B 2700/172; F25B 2700/21163
USPC ..................... 62/183, 207, 222, 228.1, 228.4
See application file for complete search history.

(56) References Cited

U.S. PATENT DOCUMENTS

| | | | |
|---|---|---|---|
| 6,260,369 B1* | 7/2001 | Yokomachi et al. | 62/228.5 |
| 2006/0150650 A1* | 7/2006 | Murase et al. | 62/222 |
| 2009/0126375 A1 | 5/2009 | Toyoshima et al. | |
| 2010/0011805 A1 | 1/2010 | Ueno | |

FOREIGN PATENT DOCUMENTS

| | | |
|---|---|---|
| JP | 2008-145066 A | 6/2008 |
| JP | 2009-133547 A | 6/2009 |
| JP | 2009-186054 A | 8/2009 |
| WO | WO 2007/049372 A1 | 5/2007 |
| WO | WO 2009/133644 A1 | 11/2009 |

OTHER PUBLICATIONS

Office Action (Notice of Reasons for Rejection) dated Jun. 4, 2013, issued by the Japanese Patent Office in the corresponding Japanese Patent Application No. 2011-553647 and an English translation thereof. (6 pages).

(Continued)

*Primary Examiner* — Marc Norman
(74) *Attorney, Agent, or Firm* — Buchanan Ingersoll & Rooney PC

(57) ABSTRACT

In the invention, control of the expansion device is carried out based on the temperature difference between the refrigerant temperature of the first representative point that becomes a predetermined enthalpy under the refrigerant pressure of the gas cooler and the detection temperature of the outlet temperature sensor, and control of the rotation speed of the compressor and/or the rotation speed of the heat medium sending device is/are carried out based on the second representative point that is, under the refrigerant pressure of the gas cooler, a temperature different from the first representative point.

16 Claims, 7 Drawing Sheets

(56) References Cited

OTHER PUBLICATIONS

International Search Report (PCT/ISA/210) issued on Apr. 20, 2010, by the Japanese Patent Office as the International Searching Authority for International Application No. PCT/JP2010/000863.
Office Action (Decision of Refusal) issued on Oct. 22, 2013, by the Japanese Patent Office in corresponding Japanese Patent Application No. 2011-553647, and an English Translation of the Office Action. (3 pages).
Japanese Office Action dated Oct. 7, 2014 issued in corresponding Japanese Patent Appln. No. 2011-553647, with English translation (5 pages).

* cited by examiner

F I G. 2
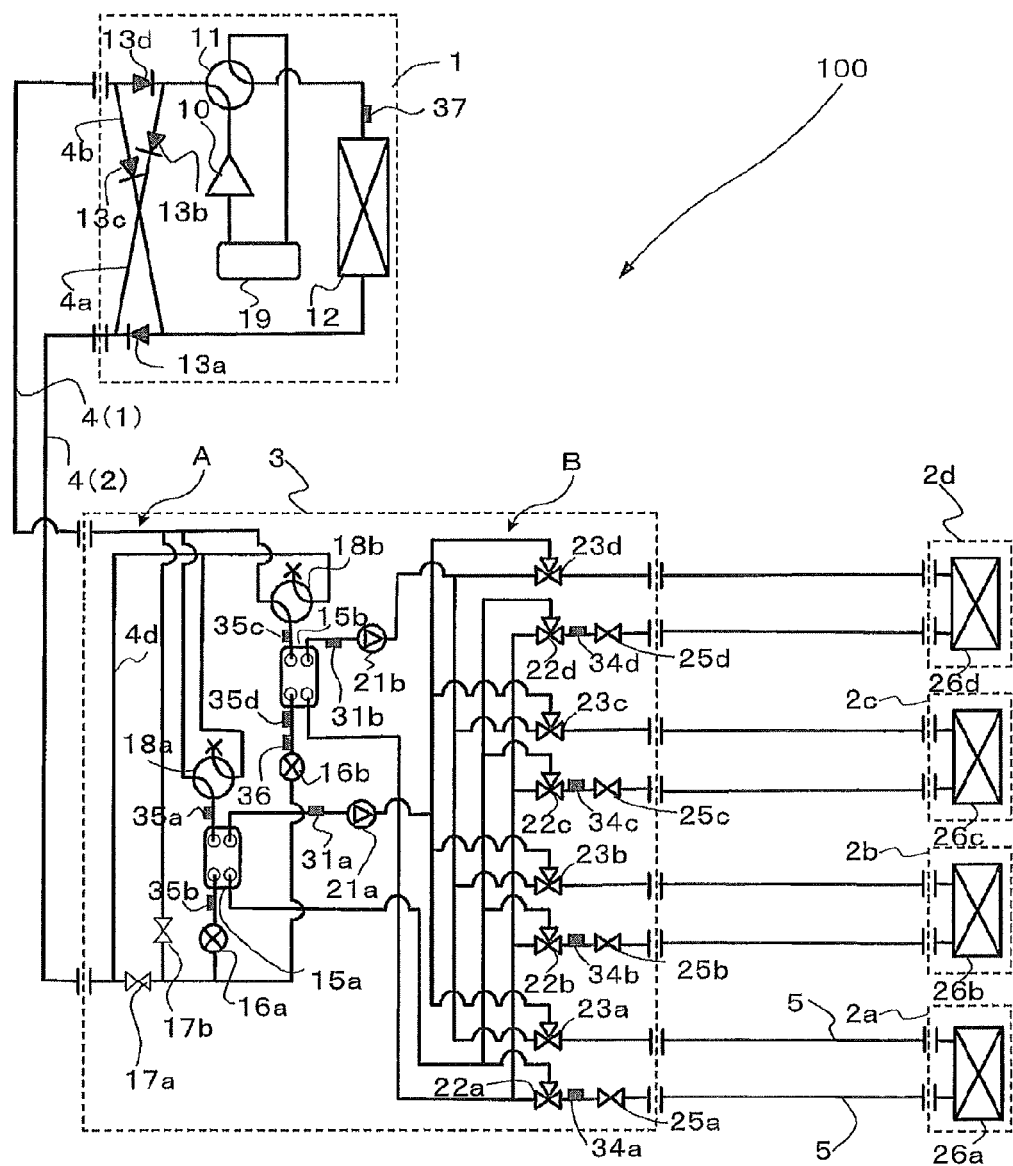

REFRIGERATION CYCLE APPARATUS

TECHNICAL FIELD

The present invention relates to a refrigeration cycle apparatus that is applied to a multi-air-conditioning apparatus for a building and the like and, more particularly, relates to a refrigeration cycle apparatus in which a pressure of a high-pressure side exceeds a critical pressure of a refrigerant.

BACKGROUND ART

In conventional air-conditioning apparatuses such as a multi-air-conditioning apparatus for a building, which is one of a refrigeration cycle apparatus, cooling operation or heating operation is carried out by circulating a refrigerant between an outdoor unit that is a heat source device disposed outdoors and indoor units disposed indoors. Specifically, an air conditioned space is cooled with the air that has been cooled by the refrigerant removing heat from the air and is heated with the air that has been heated by the refrigerant transferring its heat. Conventionally, HFC (hydrofluorocarbon) based refrigerants have been commonly used as refrigerants for such air-conditioning apparatuses. These refrigerants have been made to work in a subcritical region that is a pressure lower than its critical pressure. However, in recent years, ones using natural refrigerants such as carbon dioxide ($CO_2$) have been proposed. Since carbon dioxide has a low critical temperature, the refrigeration cycle is carried out in a supercritical state in which the refrigerant pressure in a gas cooler on the high-pressure side exceeds its critical pressure.

In such an air-conditioning apparatus that performs a refrigeration cycle while the high-pressure side is under a supercritical state, constituent components are controlled such that a pseudo-degree of subcooling is within a predetermined temperature range, where a pseudo-degree of subcooling is a temperature difference between a pseudo-condensation temperature, which is a refrigerant temperature in which a specific heat of the refrigerant at constant pressure is maximum under the refrigerant pressure in the gas cooler on the high-pressure side, and the refrigerant temperature at an outlet of the gas cooler (see Patent Literature 1, for example).

CITATION LIST

Patent Literature

Patent Literature 1: Japanese Patent Publication No. 4245044 (p. 6, FIG. 3, for example)

SUMMARY OF INVENTION

Technical Problem

In air-conditioning apparatuses such as a conventional multi-air-conditioning apparatus for a building, since operation is carried out with a refrigerant in a subcritical state, the definitions of a representative point of a condenser used to control an opening degree of an expansion device and a representative point of the condenser used to control a rotation speed of a compressor and/or a rotation speed of a heat medium sending device attached to the condenser have been set to have the same value (condensing temperature), and control has been carried out. However, when in a supercritical state, there is no condensing temperature, and, thus, some kind of value has been needed as the representative point. Albeit, no method of determining the representative point that secures a certain heat exchange capacity while maintaining high COP has been established.

In the air-conditioning apparatus disclosed in Patent Literature 1, although description is made on controlling the subcool with the point having the largest specific heat at constant pressure, there is no implication and no clarification on how to treat the definitions of the representative point of the condenser used to control the opening degree of the expansion device and the representative point of the condenser used to control the rotation speed of the compressor and/or the rotation speed of the heat medium sending device attached to the condenser.

The invention has been made to overcome the above problems and to obtain a refrigeration cycle apparatus capable of securing a certain amount of heat exchange in the gas cooler and performing operation of high COP while achieving energy saving.

Solution to Problem

The refrigeration cycle apparatus of the invention includes: a refrigerant circuit connecting a compressor, a first heat exchanger, an expansion device, and a second heat exchanger by piping, the refrigerant circuit circulating a refrigerant that transmits in a supercritical state, in which one of the first heat exchanger and the second heat exchanger is operated as a gas cooler by making the refrigerant in a supercritical state flow therethrough, the other one of the first heat exchanger and the second heat exchanger is operated as a evaporator by making the refrigerant in a low-pressure two-phase state flow therethrough, the refrigeration cycle apparatus includes a heat medium sending device that changes a flow rate of a heat medium exchanging heat with the refrigerant in the gas cooler, and an outlet temperature sensor that is provided in any position in the passage from an outlet side of the gas cooler to the evaporator, the outlet temperature sensor detecting a temperature of the refrigerant on the outlet side of the gas cooler, an opening degree of the expansion device is controlled on the basis of a temperature difference between a refrigerant temperature at a first representative point that becomes a predetermined enthalpy under the refrigerant pressure in the gas cooler and a detection temperature of the outlet temperature sensor, and a rotation speed of the compressor and/or a rotation speed of the heat medium sending device is/are controlled on the basis of a temperature at a second representative point that is a temperature different from the first representative point under the refrigerant pressure in the gas cooler.

Advantageous Effects of Invention

In the invention, control of the expansion device is carried out based on the temperature difference between the refrigerant temperature at the first representative point, which becomes a predetermined enthalpy under the refrigerant pressure of the gas cooler, and the detection temperature of the outlet temperature sensor. Control of the rotation speed of the compressor and/or the rotation speed of the heat medium sending device is/are carried out based on the second representative point that is, under the refrigerant pressure of the gas cooler, a temperature different from the first representative point.

Accordingly, the required amount of heat exchange can be maintained while keeping high COP, and energy saving can be achieved.

BRIEF DESCRIPTION OF DRAWINGS

FIG. 2 is a schematic circuit diagram illustrating an exemplary circuit configuration of the air-conditioning apparatus according to Embodiment of the invention.

DESCRIPTION OF EMBODIMENTS

Embodiment in which a refrigeration cycle apparatus of the invention is applied to an air-conditioning apparatus will be explained subsequently with reference to the drawings.

Figure 1:
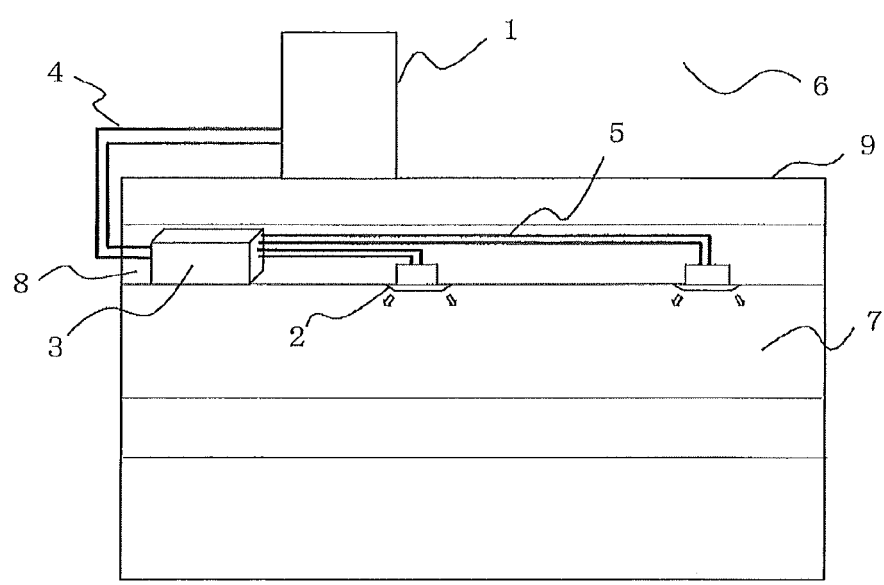
FIG. 1 is a schematic diagram illustrating an exemplary installation of an air-conditioning apparatus according to Embodiment of the invention.

FIG. 1 is a schematic diagram illustrating an exemplary installation of an air-conditioning apparatus according to Embodiment of the invention. The exemplary installation of the air-conditioning apparatus will be described with reference to FIG. 1. This air-conditioning apparatus uses refrigeration cycles (a refrigerant circuit A and a heat medium circuit B) in which refrigerants (a heat source side refrigerant or a heat medium) circulate such that a cooling mode or a heating mode can be freely selected as its operation mode in each indoor unit. It should be noted that the dimensional relationships of components in FIG. 1 and other subsequent figures may be different from the actual ones.

Referring to FIG. 1, the air-conditioning apparatus according to Embodiment includes a single outdoor unit 1, functioning as a heat source unit, a plurality of indoor units 2, and a heat medium relay unit 3 disposed between the outdoor unit 1 and the indoor units 2. The heat medium relay unit 3 exchanges heat between the heat source side refrigerant and the heat medium. The outdoor unit 1 and the heat medium relay unit 3 are connected with refrigerant pipings 4 thorough which the heat source side refrigerant flows. The heat medium relay unit 3 and each indoor unit 2 are connected with pipings 5 (heat medium pipings) through which the heat medium flows. Cooling energy or heating energy generated in the outdoor unit 1 is delivered through the heat medium relay unit 3 to the indoor units 2.

The outdoor unit 1 is typically disposed in an outdoor space 6 which is a space (e.g., a roof) outside a structure 9, such as a building, and is configured to supply cooling energy or heating energy through the heat medium relay unit 3 to the indoor units 2. Each indoor unit 2 is disposed at a position that can supply cooling air or heating air to an indoor space 7, which is a space (e.g., a living room) inside the structure 9, and supplies air for cooling or air for heating to the indoor space 7 that is an air conditioned space. The heat medium relay unit 3 is configured with a housing separate from the outdoor unit 1 and the indoor units 2 such that the heat medium relay unit 3 can be disposed at a position different from those of the outdoor space 6 and the indoor space 7, and is connected to the outdoor unit 1 through the refrigerant pipings 4 and is connected to the indoor units 2 through the pipings 5 to convey cooling energy or heating energy, supplied from the outdoor unit 1 to the indoor units 2.

As illustrated in FIG. 1, in the air-conditioning apparatus according to Embodiment, the outdoor unit 1 is connected to the heat medium relay unit 3 using two refrigerant pipings 4, and the heat medium relay unit 3 is connected to each indoor unit 2 using two pipings 5. As described above, in the air-conditioning apparatus according to Embodiment, each of the units (the outdoor unit 1, the indoor units 2, and the heat medium relay unit 3) is connected using two pipings (the refrigerant pipings 4 or the pipings 5), thus construction is facilitated.

Furthermore, FIG. 1 illustrates a state where the heat medium relay unit 3 is disposed in the structure 9 but in a space different from the indoor space 7, for example, a space above a ceiling (hereinafter, simply referred to as a "space 8"). The heat medium relay unit 3 can be disposed in other spaces, such as a common space where an elevator or the like is installed. In addition, although FIG. 1 illustrates a case in which the indoor units 2 are of a ceiling-mounted cassette type, the indoor units are not limited to this type and, for example, a ceiling-concealed type, a ceiling-suspended type, or any type of indoor unit may be used as long as the unit can blow out heating air or cooling air into the indoor space 7 directly or through a duct or the like.

FIG. 1 illustrates a case in which the outdoor unit 1 is disposed in the outdoor space 6. The arrangement is not limited to this case. For example, the outdoor unit 1 may be disposed in an enclosed space, for example, a machine room with a ventilation opening, may be disposed inside the structure 9 as long as waste heat can be exhausted through an exhaust duct to the outside of the structure 9, or may be disposed inside the structure 9 when the used outdoor unit 1 is of a water-cooled type. Even when the outdoor unit 1 is disposed in such a place, no problem in particular will occur.

Furthermore, the heat medium relay unit 3 can be disposed near the outdoor unit 1. It should be noted that when the distance from the heat medium relay unit 3 to the indoor unit 2 is excessively long, because power for conveying the heat medium is significantly large, the advantageous effect of energy saving is reduced. Additionally, the numbers of connected outdoor unit 1, indoor units 2, and heat medium relay unit 3 are not limited to those illustrated in FIG. 1. The numbers thereof can be determined in accordance with the structure 9 where the air-conditioning apparatus according to Embodiment is installed.

FIG. 2 is a schematic circuit diagram illustrating an exemplary circuit configuration of the air-conditioning apparatus (hereinafter, referred to as an "air-conditioning apparatus 100") according to Embodiment of the invention. The detailed configuration of the air-conditioning apparatus 100 will be described with reference to FIG. 2. As illustrated in FIG. 2, the outdoor unit 1 and the heat medium relay unit 3 are connected with the refrigerant pipings 4 through heat exchangers related to heat medium 15a and 15b included in the heat medium relay unit 3. Furthermore, the heat medium relay unit 3 and the indoor units 2 are connected with the pipings 5 through the heat exchangers related to heat medium 15a and 15b.

[Outdoor Unit 1]

The outdoor unit 1 includes a compressor 10, a first refrigerant flow switching device 11, such as a four-way valve, a heat source side heat exchanger 12, and an accumulator 19, which are connected in series with the refrigerant pipings 4. The outdoor unit 1 further includes a first connecting piping 4a, a second connecting piping 4b, a check valve 13a, a check valve 13b, a check valve 13c, and a check valve 13d. By providing the first connecting piping 4a, the second connecting piping 4b, the check valve 13a, the check valve 13b, the check valve 13c, and the check valve 13d, the heat source side refrigerant can be made to flow into the heat medium relay unit 3 in a constant direction irrespective of the operation requested by the indoor units 2.

The compressor 10 sucks in the heat source side refrigerant and compresses the heat source side refrigerant to a high-temperature high-pressure state. The compressor 10 may include, for example, a capacity-controllable inverter compressor. The first refrigerant flow switching device 11 switches the flow of the heat source side refrigerant between a heating operation (a heating only operation mode and a heating main operation mode) and a cooling operation (a cooling only operation mode and a cooling main operation mode). The heat source side heat exchanger 12 serving as a first heat exchanger functions as an evaporator in the heating operation, functions as a gas cooler in the cooling operation, exchanges heat between air serving as a heat medium supplied from the air-sending device (heat medium sending device), such as a fan (not illustrated), and the heat source side refrigerant, and evaporates and gasifies or cools the heat source side refrigerant. The accumulator 19 is provided on the suction side of the compressor 10 and retains excess refrigerant.

The check valve 13d is provided in the refrigerant piping 4 between the heat medium relay unit 3 and the first refrigerant flow switching device 11 and permits the heat source side refrigerant to flow only in a predetermined direction (the direction from the heat medium relay unit 3 to the outdoor unit 1). The check valve 13a is provided in the refrigerant piping 4 between the heat source side heat exchanger 12 and the heat medium relay unit 3 and permits the heat source side refrigerant to flow only in a predetermined direction (the direction from the outdoor unit 1 to the heat medium relay unit 3). The check valve 13b is provided in the first connecting piping 4a and allows the heat source side refrigerant discharged from the compressor 10 to flow through the heat medium relay unit 3 during the heating operation. The check valve 13c is disposed in the second connecting piping 4b and allows the heat source side refrigerant, returning from the heat medium relay unit 3 to flow to the suction side of the compressor 10 during the heating operation.

The first connecting piping 4a connects the refrigerant piping 4, between the first refrigerant flow switching device 11 and the check valve 13d, to the refrigerant piping 4, between the check valve 13a and the heat medium relay unit 3, in the outdoor unit 1. The second connecting piping 4b is configured to connect the refrigerant piping 4, between the check valve 13d and the heat medium relay unit 3, to the refrigerant piping 4, between the heat source side heat exchanger 12 and the check valve 13a, in the outdoor unit 1. It should be noted that FIG. 2 illustrates a case in which the first connecting piping 4a, the second connecting piping 4b, the check valve 13a, the check valve 13b, the check valve 13c, and the check valve 13d are disposed, but the device is not limited to this case and may be other devices in which the flow direction is made to be the same.

[Indoor Units 2]

The indoor units 2 each include a use side heat exchanger 26. The use side heat exchanger 26 is each connected to a heat medium flow control device 25 and a second heat medium flow switching device 23 in the heat medium relay unit 3 with the pipings 5. Each of the use side heat exchangers 26 exchanges heat between air supplied from an air-sending device, such as a fan, (not illustrated) and the heat medium in order to generate air for heating or air for cooling supplied to the indoor space 7.

FIG. 2 illustrates a case in which four indoor units 2 are connected to the heat medium relay unit 3. Illustrated are, from the bottom of the drawing, an indoor unit 2a, an indoor unit 2b, an indoor unit 2c, and an indoor unit 2d. In addition, the use side heat exchangers 26 are illustrated as, from the bottom of the drawing, a use side heat exchanger 26a, a use side heat exchanger 26b, a use side heat exchanger 26c, and a use side heat exchanger 26d each corresponding to the indoor units 2a to 2d. As is the case of FIG. 1, the number of connected indoor units 2 illustrated in FIG. 2 is not limited to four.

[Heat Medium Relay Unit 3]

The heat medium relay unit 3 includes the two heat exchangers related to heat medium 15 each serving as a second heat exchanger, two expansion devices 16, two on-off devices 17, two second refrigerant flow switching devices 18, two pumps 21 each serving as a heat medium sending device, four first heat medium flow switching devices 22, the four second heat medium flow switching devices 23, and the four heat medium flow control devices 25.

Each of the two heat exchangers related to heat medium 15 (the heat exchanger related to heat medium 15a and the heat exchanger related to heat medium 15b) functions as a gas cooler or an evaporator and exchanges heat between the heat source side refrigerant and the heat medium in order to transfer cooling energy or heating energy, generated in the outdoor unit 1 and stored in the heat source side refrigerant, to the heat medium. The heat exchanger related to heat medium 15a is disposed between an expansion device 16a and a second refrigerant flow switching device 18a in a refrigerant circuit A and is used to heat the heat medium in the heating only operation mode and is used to cool the heat medium in the cooling only operation mode, the cooling main operation mode, and the heating main operation mode. Furthermore, the heat exchanger related to heat medium 15b is disposed between an expansion device 16b and a second refrigerant flow switching device 18b in the refrigerant circuit A and is used to heat the heat medium in the heating only operation mode, the cooling main operation mode, and the heating main operation mode and is used to cool the heat medium in the cooling only operation mode.

The two expansion devices 16 (the expansion device 16a and the expansion device 16b) each have functions of a reducing valve and an expansion valve and are configured to reduce the pressure of and expand the heat source side refrigerant. The expansion device 16a is disposed upstream of the heat exchanger related to heat medium 15a, upstream regarding the heat source side refrigerant flow during the cooling operation. The expansion device 16b is disposed upstream of the heat exchanger related to heat medium 15b, upstream regarding the heat source side refrigerant flow during the cooling operation. Each of the two expansion devices 16 may include a component having a variably controllable opening degree, such as an electronic expansion valve.

The two on-off devices 17 (an on-off device 17a (a third refrigerant flow switching device) and an on-off device 17b) each include, for example, a two-way valve and open or close the refrigerant piping 4. The on-off device 17a is disposed in the refrigerant piping 4(1) on the inlet side of the heat source side refrigerant. The on-off device 17b is disposed in a piping connecting the refrigerant piping 4(2) on the inlet side of the heat source side refrigerant and the refrigerant piping 4(1) on an outlet side thereof. The two second refrigerant flow switching devices 18 (second refrigerant flow switching devices 18a and 18b) each include, for example, a four-way valve and switch passages of the heat source side refrigerant in accordance with the operation mode. The second refrigerant flow switching device 18a is disposed downstream of the heat exchanger related to heat medium 15a, downstream regarding the heat source side refrigerant flow during the cooling operation. The second refrigerant flow switching device 18b is disposed downstream of the heat exchanger related to heat medium 15b, downstream regarding the heat source side refrigerant flow during the cooling only operation.

A bypass piping 4d that bypasses the heat exchangers related to heat medium branches, at the upstream side of the on-off device 17a, the refrigerant piping 4(2) on the inlet side of the heat source side refrigerant, and connects the refrigerant piping 4(2) to the two second refrigerant flow switching devices 18. When the on-off device 17a is opened, heat source side refrigerant passages from the outdoor unit 1 to the expansion devices 16 are formed. Furthermore, when the on-off device 17a is closed, heat source side refrigerant passages from the outdoor unit 1 to the second refrigerant flow switching devices 18 are formed. By switching each of the two second refrigerant flow switching devices 18, switching between the heat source side refrigerant passages from the outdoor unit 1 to the expansion devices 16 and the heat source side refrigerant passages from the outdoor unit 1 to the second refrigerant flow switching devices 18 is carried out.

The two pumps 21 (a pump 21a and a pump 21b) circulate the heat medium flowing through the piping 5. The pump 21a is disposed in the piping 5 between the heat exchanger related to heat medium 15a and the second heat medium flow switching devices 23. The pump 21b is disposed in the piping 5 between the heat exchanger related to heat medium 15b and the second heat medium flow switching devices 23. Each of the two pumps 21 may include, for example, a capacity-controllable pump. Note that the pump 21a may be provided in the piping 5 between the heat exchanger related to heat medium 15a and the first heat medium flow switching devices 22. Furthermore, the pump 21b may be provided in the piping 5 between the heat exchanger related to heat medium 15b and the first heat medium flow switching devices 22.

The four first heat medium flow switching devices 22 (first heat medium flow switching devices 22a to 22d) each include, for example, a three-way valve and switches passages of the heat medium. The first heat medium flow switching devices 22 are arranged so that the number thereof (four in this case) corresponds to the installed number of indoor units 2. Each first heat medium flow switching device 22 is disposed on an outlet side of a heat medium passage of the corresponding use side heat exchanger 26 such that one of the three ways is connected to the heat exchanger related to heat medium 15a, another one of the three ways is connected to the heat exchanger related to heat medium 15b, and the other one of the three ways is connected to the corresponding heat medium flow control device 25. Furthermore, illustrated from the bottom of the drawing are the first heat medium flow switching device 22a, the first heat medium flow switching device 22b, the first heat medium flow switching device 22c, and the first heat medium flow switching device 22d, so as to correspond to the respective indoor units 2.

The four second heat medium flow switching devices 23 (second heat medium flow switching devices 23a to 23d) each include, for example, a three-way valve and are configured to switch passages of the heat medium. The second heat medium flow switching devices 23 are arranged so that the number thereof (four in this case) corresponds to the installed number of indoor units 2. Each second heat medium flow switching device 23 is disposed on an inlet side of the heat medium passage of the corresponding use side heat exchanger 26 such that one of the three ways is connected to the heat exchanger related to heat medium 15a, another one of the three ways is connected to the heat exchanger related to heat medium 15b, and the other one of the three ways is connected to the corresponding use side heat exchanger 26. Furthermore, illustrated from the bottom of the drawing are the second heat medium flow switching device 23a, the second heat medium flow switching device 23b, the second heat medium flow switching device 23c, and the second heat medium flow switching device 23d so as to correspond to the respective indoor units 2.

The four heat medium flow control devices 25 (heat medium flow control devices 25a to 25d) each include, for example, a two-way valve using a stepping motor, for example, and is capable of controlling the area of opening of the piping 5, which is the flow passage of the heat medium. The heat medium flow control devices 25 are arranged so that the number thereof (four in this case) corresponds to the installed number of indoor units 2. Each heat medium flow control device 25 is disposed on the outlet side of the heat medium passage of the corresponding use side heat exchanger 26 such that one way is connected to the use side heat exchanger 26 and the other way is connected to the first heat medium flow switching device 22. Furthermore, illustrated from the bottom of the drawing are the heat medium flow control device 25a, the heat medium flow control device 25b, the heat medium flow control device 25c, and the heat medium flow control device 25d so as to correspond to the respective indoor units 2.

Note that the Embodiment will describe a case in which each heat medium flow control device 25 is disposed on the outlet side (on the downstream side) of the corresponding use side heat exchanger 26 but the arrangement is not limited to this case. Each heat medium flow control device 25 may be disposed on the inlet side (on the upstream side) of the use side heat exchanger 26 such that one way is connected to the use side heat exchanger 26 and the other way is connected to the second heat medium flow switching device 23.

The heat medium relay unit 3 includes various detecting means (two first temperature sensors 31, four second temperature sensors 34, four third temperature sensors 35, and a pressure sensor 36). Information (temperature information and pressure information) detected by these detecting means are transmitted to a controller (not illustrated) that performs integrated control of the operation of the air-conditioning apparatus 100 such that the information is used to control, for example, the operating frequency of the compressor 10, the rotation speed of the air-sending device (not illustrated), switching of the first refrigerant flow switching device 11, the operating frequency of the pumps 21, switching by the second refrigerant flow switching devices 18, and switching of passages of the heat medium.

Each of the two first temperature sensors 31 (a first temperature sensor 31a and a first temperature sensor 31b) detects the temperature of the heat medium flowing out of the corresponding heat exchanger related to heat medium 15, namely, the heat medium at an outlet of the corresponding heat exchanger related to heat medium 15 and may include, for example, a thermistor. The first temperature sensor 31a is disposed in the piping 5 on the inlet side of the pump 21a. The first temperature sensor 31b is disposed in the piping 5 on the inlet side of the pump 21b.

Each of the four second temperature sensors 34 (second temperature sensor 34a to 34d) is disposed between the corresponding first heat medium flow switching device 22 and heat medium flow control device 25 and detects the temperature of the heat medium flowing out of each use side heat exchanger 26. A thermistor or the like may be used as the second temperature sensor 34. The second temperature sensors 34 are arranged so that the number (four in this case) corresponds to the installed number of indoor units 2. Furthermore, illustrated from the bottom of the drawing are the second temperature sensor 34a, the second temperature sensor 34b, the second temperature sensor 34c, and the second temperature sensor 34d so as to correspond to the respective indoor units 2.

Each of the four third temperature sensors 35 (third temperature sensors 35a to 35d) is disposed on the inlet side or the outlet side of a heat source side refrigerant of the heat exchanger related to heat medium 15 and detects the temperature of the heat source side refrigerant flowing into the heat exchanger related to heat medium 15 or the temperature of the heat source side refrigerant flowing out of the heat exchanger related to heat medium 15 and may include, for example, a thermistor. The third temperature sensor 35a is disposed between the heat exchanger related to heat medium 15a and the second refrigerant flow switching device 18a. The third temperature sensor 35b is disposed between the heat exchanger related to heat medium 15a and the expansion device 16a. The third temperature sensor 35c is disposed between the heat exchanger related to heat medium 15b and the second refrigerant flow switching device 18b. The third temperature sensor 35d is disposed between the heat exchanger related to heat medium 15b and the expansion device 16b.

The pressure sensor 36 is disposed between the heat exchanger related to heat medium 15b and the expansion device 16b, similar to the installation position of the third temperature sensor 35d, and is configured to detect the pressure of the heat source side refrigerant flowing between the heat exchanger related to heat medium 15b and the expansion device 16b.

Further, a fourth temperature sensor 37 is provided in the outdoor unit 1. The fourth temperature sensor 37 is disposed between the four-way valve 11 and the heat source side heat exchanger 12 and detects the temperature of the heat source refrigerant flowing into the heat source side heat exchanger 12, and may include a thermister or the like.

Further, the controller (not illustrated) includes, for example, a microcomputer and controls, for example, the operating frequency of the compressor 10, the rotation speed (including ON/OFF) of the air-sending device, switching of the first refrigerant flow switching device 11, driving of the pumps 21, the opening degree of each expansion device 16, on and off of each on-off device 17, switching of the second refrigerant flow switching devices 18, switching of the first heat medium flow switching devices 22, switching of the second heat medium flow switching devices 23, and the driving of each heat medium flow control device 25 on the basis of the information detected by the various detecting means and an instruction from a remote control to carry out the operation modes which will be described later. Note that the controller may be provided to each unit, or may be provided to the outdoor unit 1 or the heat medium relay unit 3.

The pipings 5 in which the heat medium flows include the pipings connected to the heat exchanger related to heat medium 15a and the pipings connected to the heat exchanger related to heat medium 15b. Each piping 5 is branched (into four in this case) in accordance with the number of indoor units 2 connected to the heat medium relay unit 3. The pipings 5 are connected with the first heat medium flow switching devices 22 and the second heat medium flow switching devices 23. Controlling the first heat medium flow switching devices 22 and the second heat medium flow switching devices 23 determines whether the heat medium flowing from the heat exchanger related to heat medium 15a is allowed to flow into the use side heat exchanger 26 or whether the heat medium flowing from the heat exchanger related to heat medium 15b is allowed to flow into the use side heat exchanger 26.

In the air-conditioning apparatus 100, the compressor 10, the first refrigerant flow switching device 11, the heat source side heat exchanger 12, the on-off devices 17, the second refrigerant flow switching devices 18, a refrigerant passage of the heat exchanger related to heat medium 15a, the expansion devices 16, and the accumulator 19 are connected through the refrigerant piping 4, thus forming the refrigerant circuit A. In addition, a heat medium passage of the heat exchanger related to heat medium 15a, the pumps 21, the first heat medium flow switching devices 22, the heat medium flow control devices 25, the use side heat exchangers 26, and the second heat medium flow switching devices 23 are connected through the pipings 5, thus forming the heat medium circuit B. In other words, the plurality of use side heat exchangers 26 are connected in parallel to each of the heat exchangers related to heat medium 15, thus turning the heat medium circuit B into a multi-system.

Accordingly, in the air-conditioning apparatus 100, the outdoor unit 1 and the heat medium relay unit 3 are connected through the heat exchanger related to heat medium 15a and the heat exchanger related to heat medium 15b arranged in the heat medium relay unit 3. The heat medium relay unit 3 and each indoor unit 2 are connected through the heat exchanger related to heat medium 15a and the heat exchanger related to heat medium 15b. In other words, in the air-conditioning apparatus 100, the heat exchanger related to heat medium 15a and the heat exchanger related to heat medium 15b each exchange heat between the heat source side refrigerant circulating in the refrigerant circuit A and the heat medium circulating in the heat medium circuit B.

As the heat medium, a single phase liquid that does not change into two phases, namely, gas and liquid, while circulating in the heat medium circulation circuit B is used. For example, water or antifreeze solution is used.

As the heat source side refrigerant, a refrigerant that reaches a supercritical state on a discharge side of the compressor is used. For example, a refrigerant that transmits in a supercritical state such as carbon dioxide or a mixed refrigerant of carbon dioxide and diethyl ether is used.

Various operation modes executed by the air-conditioning apparatus 100 will be described below. The air-conditioning apparatus 100 allows each indoor unit 2, on the basis of an instruction from the indoor unit 2, to perform a cooling operation or heating operation. Specifically, the air-conditioning apparatus 100 may allow all of the indoor units 2 to perform the same operation and also allow each of the indoor units 2 to perform different operations.

The operation modes carried out by the air-conditioning apparatus 100 includes a cooling only operation mode in which all of the operating indoor units 2 perform the cooling operation, a heating only operation mode in which all of the operating indoor units 2 perform the heating operation, a cooling main operation mode that is a cooling and heating mixed operation mode in which cooling load is larger, and a heating main operation mode that is a cooling and heating mixed operation mode in which heating load is larger. The operation modes will be described below with respect to the flow of the heat source side refrigerant and that of the heat medium with reference to the P-h diagram illustrated in FIG. 7.

[Cooling Only Operation Mode]

Figure 3:
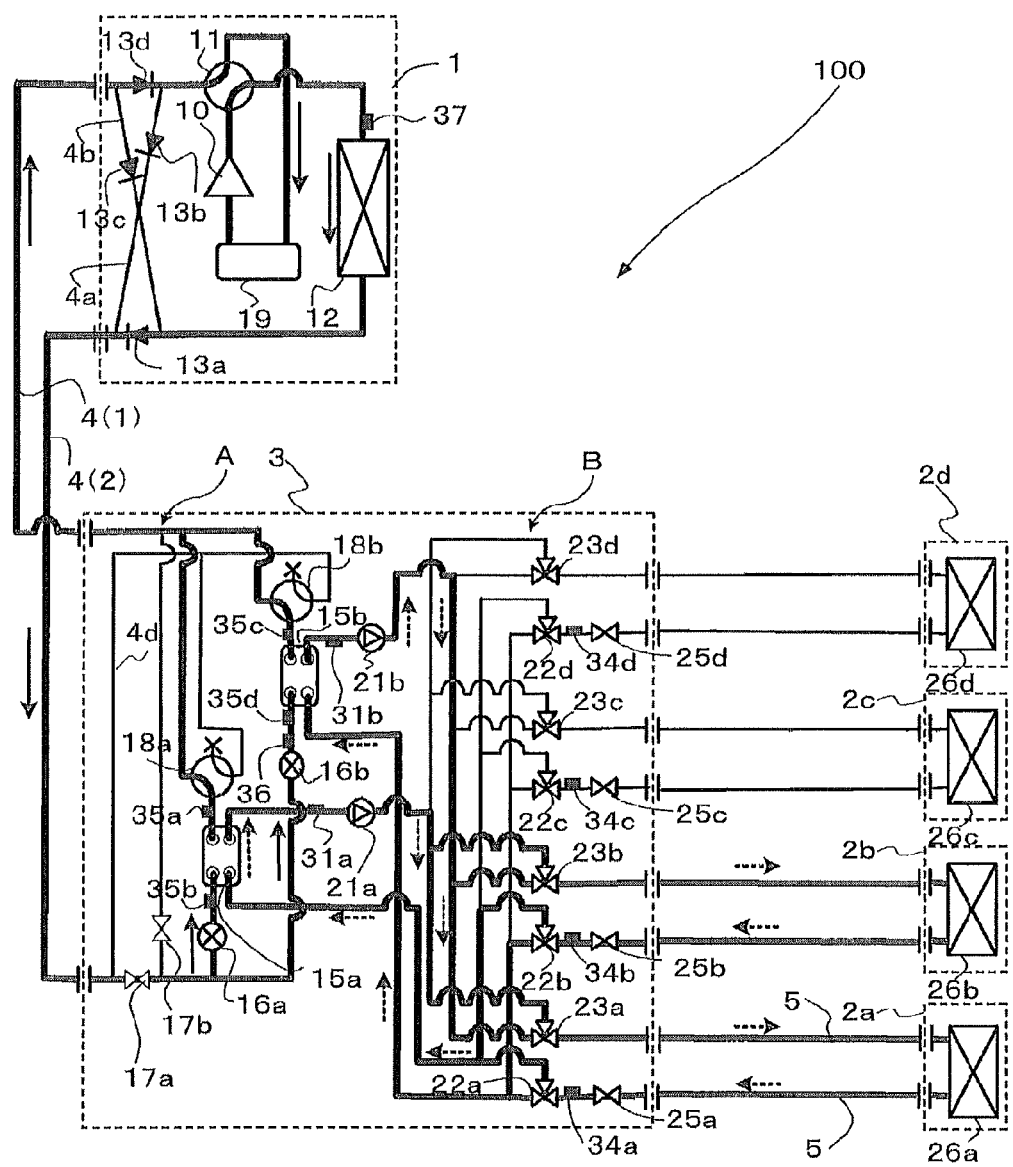
FIG. 3 is a refrigerant circuit diagram illustrating flows of refrigerants in a cooling only operation mode of the air-conditioning apparatus according to Embodiment of the invention.

FIG. 3 is a refrigerant circuit diagram illustrating the flows of the refrigerants in the cooling only operation mode of the air-conditioning apparatus 100. The cooling only operation mode will be described with respect to a case in which cooling loads are generated only in the use side heat exchanger 26a and the use side heat exchanger 26b in FIG. 3. Furthermore, in FIG. 3, pipings indicated by thick lines indicate pipings through which the refrigerants (the heat source side refrigerant and the heat medium) flow. In addition, the direction of flow of the heat source side refrigerant is indicated by solid-line arrows and the direction of flow of the heat medium is indicated by broken-line arrows in FIG. 3. Further, FIG. 7 is a P-h diagram illustrating the operation of the refrigeration cycle.

In the cooling only operation mode illustrated in FIG. 3, the first refrigerant flow switching device 11 is switched such that the heat source side refrigerant discharged from the compressor 10 flows into the heat source side heat exchanger 12 in the outdoor unit 1. In the heat medium relay unit 3, the pump 21a and the pump 21b are driven, the heat medium flow control device 25a and the heat medium flow control device 25b are opened, and the heat medium flow control device 25c and the heat medium flow control device 25d are totally closed, such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant circuit A will be described.

Figure 7:
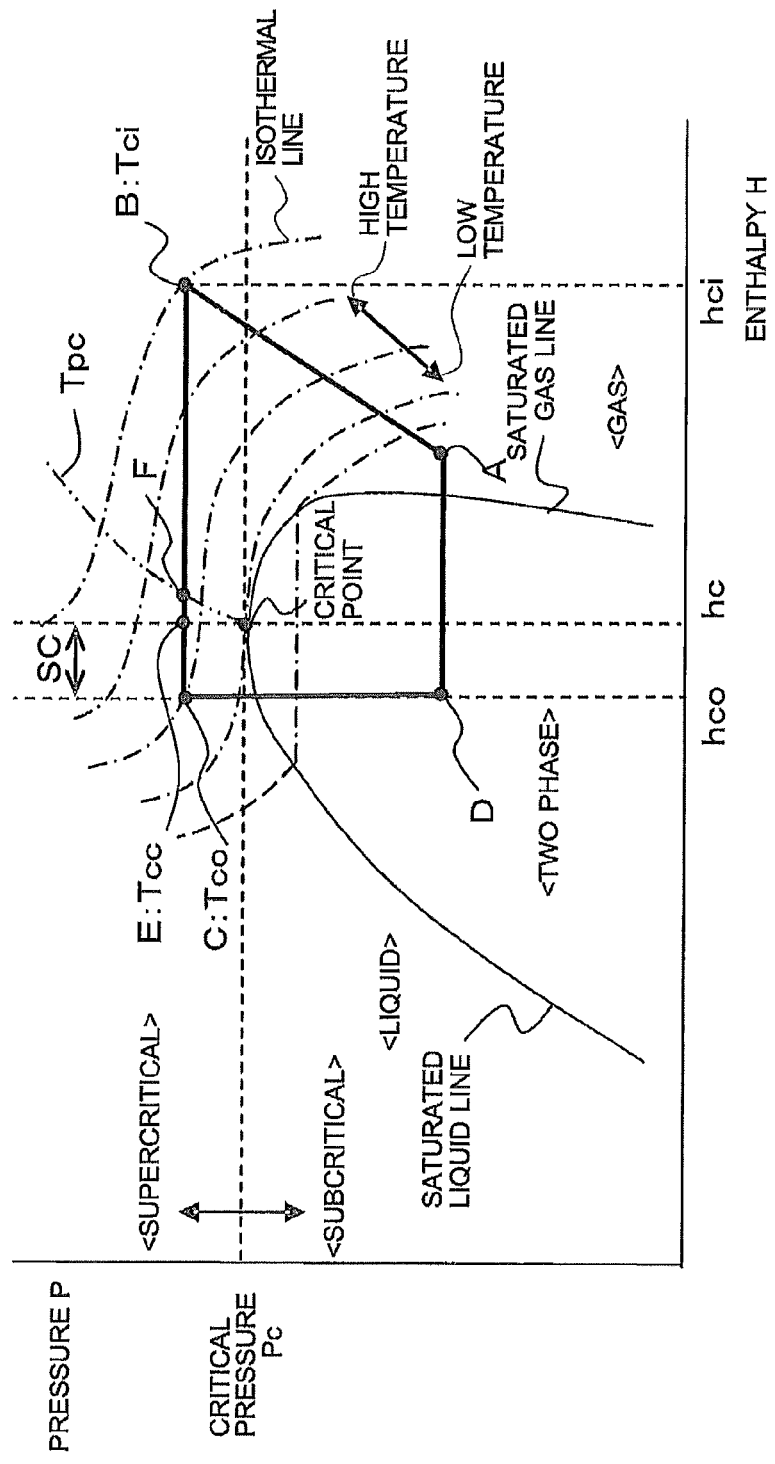
FIG. 7 is a P-h diagram illustrating an operation of a refrigeration cycle of Embodiment of the invention.

A low-temperature low-pressure refrigerant (point A of FIG. 7) is compressed by the compressor 10 and is discharged as a high-temperature high-pressure refrigerant in a supercritical state therefrom (point B of FIG. 7). The high-temperature high-pressure refrigerant in the supercritical state discharged from the compressor 10 flows through the first refrigerant flow switching device 11 into the heat source side heat exchanger 12. Then, the heat source side heat exchanger 12 functions as a gas cooler and transfers heat to the outdoor air, thus cooling the refrigerant into a middle-temperature high pressure refrigerant that is in a supercritical state (point C of FIG. 7). Since the refrigerant in the gas cooler is in a supercritical state that is above the critical point, the refrigerant changes its temperature while transmitting in the supercritical state, which is neither gas nor liquid. The middle-temperature high pressure refrigerant in the supercritical state that has flowed out of the heat source side heat exchanger 12 passes through the check valve 13a, flows out of the outdoor unit 1, passes through the refrigerant piping 4, and flows into the heat medium relay unit 3. The middle-temperature high pressure refrigerant in the supercritical state that has flowed into the heat medium relay unit 3 is branched after passing through the on-off device 17a and is expanded into a low-temperature low-pressure two-phase refrigerant by the expansion device 16a and the expansion device 16b (point D of FIG. 7).

This two-phase refrigerant flows into each of the heat exchanger related to heat medium 15a and the heat exchanger related to heat medium 15b, functioning as evaporators, removes heat from the heat medium circulating in the heat medium circuit B, cools the heat medium, and turns into a low-temperature low-pressure gas refrigerant (point A of FIG. 7). The gas refrigerant, which has flowed out of each of the heat exchanger related to heat medium 15a and the heat exchanger related to heat medium 15b, flows out of the heat medium relay unit 3 through the corresponding one of the second refrigerant flow switching device 18a and the second refrigerant flow switching device 18b, passes through the refrigerant piping 4, and again flows into the outdoor unit 1. The refrigerant that has flowed into the outdoor unit 1 passes through the check valve 13d, the first refrigerant flow switching device 11, and the accumulator 19, and is again sucked into the compressor 10.

At this time, the opening degree of the expansion device 16a is controlled such that superheat (the degree of superheat) is constant, the superheat being obtained as the difference between a temperature detected by the third temperature sensor 35a and that detected by the third temperature sensor 35b. Similarly, the opening degree of the expansion device 16b is controlled such that superheat is constant, in which the superheat is obtained as the difference between a temperature detected by a third temperature sensor 35c and that detected by a third temperature sensor 35d. In addition, the on-off device 17a is opened and the on-off device 17b is closed.

Further, at this time, the pseudo-condensation temperature is obtained using a gas cooler inlet temperature Tci detected by the fourth temperature sensor 37 serving as an inlet temperature sensor and a gas cooler outlet temperature Tco detected by the third temperature sensors 35a or 35c each serving as outlet temperature sensors. The rotation speed of the compressor 10 and/or the rotation speed of the fan, serving as a heat medium sending device, attached to the heat source side heat exchanger 12 is/are controlled such that this pseudo-condensation temperature becomes a target value. Details of the pseudo-condensation temperature will be described later.

Next, the flow of the heat medium in the heat medium circuit B will be described.

In the cooling only operation mode, both the heat exchanger related to heat medium 15a and the heat exchanger related to heat medium 15b transfer cooling energy of the heat source side refrigerant to the heat medium, and the pump 21a and the pump 21b allow the cooled heat medium to flow through the pipings 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b. The heat medium removes heat from the indoor air in each of the use side heat exchanger 26a and the use side heat exchanger 26b, thus cools the indoor space 7.

Then, the heat medium flows out of the use side heat exchanger 26a and the use side heat exchanger 26b and flows into the heat medium flow control device 25a and the heat medium flow control device 25b, respectively. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has flowed out of the heat medium flow control device 25a and the heat medium flow control device 25b, passes through the first heat medium flow switching device 22a and the first heat medium flow switching device 22b, respectively, flows into the heat exchanger related to heat medium 15a and the heat exchanger related to heat medium 15b, and is again sucked into the pump 21a and the pump 21b.

Note that in the pipings 5 of each use side heat exchanger 26, the heat medium is directed to flow from the second heat medium flow switching device 23 through the heat medium flow control device 25 to the first heat medium flow switching device 22. The air conditioning load required in the indoor space 7 can be satisfied by controlling the difference between a temperature detected by the first temperature sensor 31a or a temperature detected by the first temperature sensor 31b and a temperature detected by the second temperature sensor 34 so that difference is maintained at a target value. As regards a temperature at the outlet of each heat exchanger related to heat medium 15, either of the temperature detected by the first temperature sensor 31a or that detected by the first temperature sensor 31b may be used. Alternatively, the mean temperature of the two may be used. At this time, the opening degree of each of the first heat medium flow switching devices 22 and the second heat medium flow switching devices 23 are set to a medium degree such that passages to both of the heat exchanger related to heat medium 15a and the heat exchanger related to heat medium 15b are established.

Upon carrying out the cooling only operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 3, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Heating Only Operation Mode]

Figure 4:
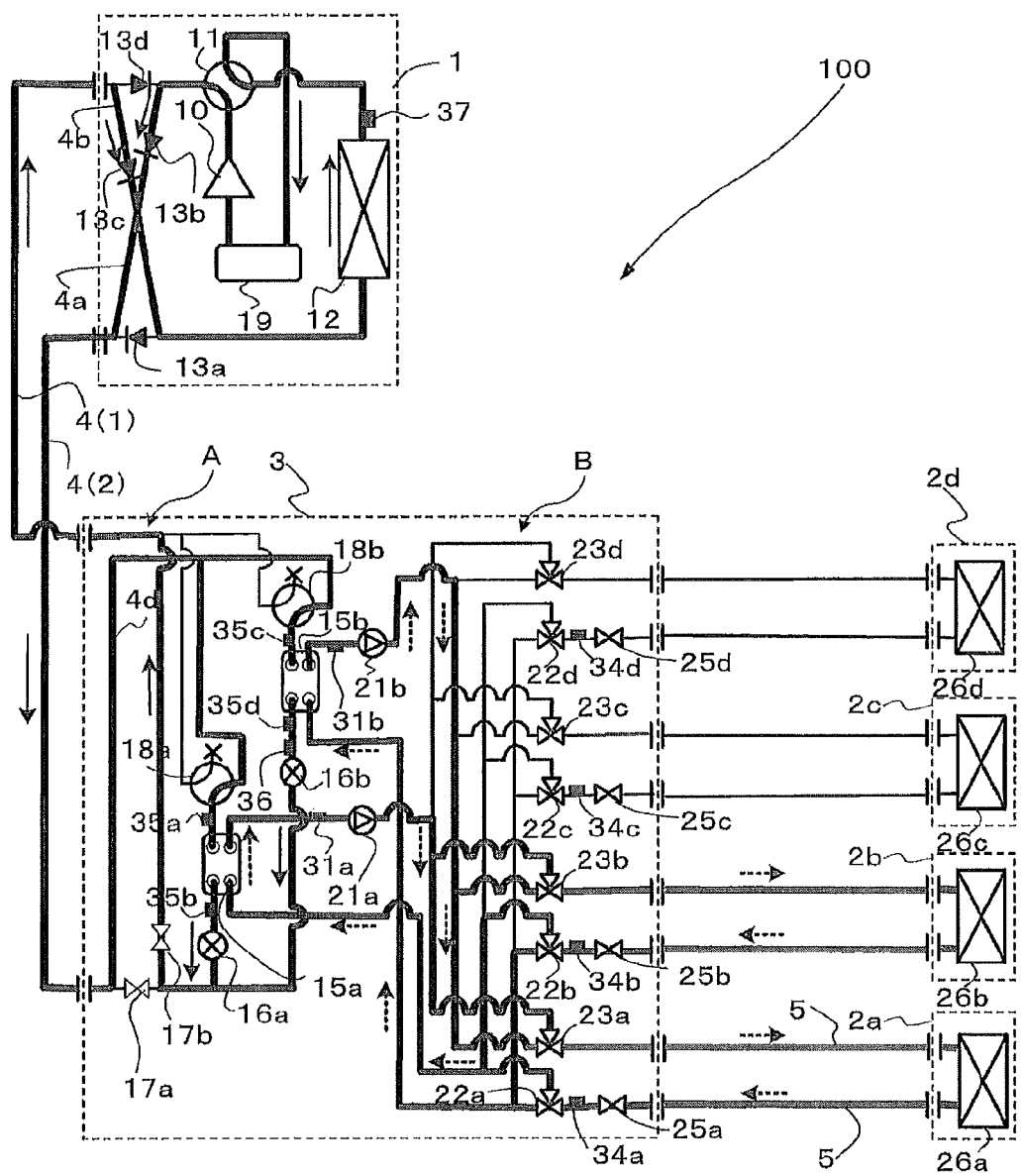
FIG. 4 is a refrigerant circuit diagram illustrating flows of refrigerants in a heating only operation mode of the air-conditioning apparatus according to Embodiment of the invention.

FIG. 4 is a refrigerant circuit diagram illustrating the flows of the refrigerants in the heating only operation mode of the air-conditioning apparatus 100. The heating only operation mode will be described with respect to a case in which heating loads are generated only in the use side heat exchanger 26a and the use side heat exchanger 26b in FIG. 4. Furthermore, in FIG. 4, pipings indicated by thick lines indicate pipings through which the refrigerants (the heat source side refrigerant and the heat medium) flow. In addition, the direction of flow of the heat source side refrigerant is indicated by solid-line arrows and the direction of flow of the heat medium is indicated by broken-line arrows in FIG. 4.

In the heating only operation mode illustrated in FIG. 4, the first refrigerant flow switching device 11 is switched such that the heat source side refrigerant discharged from the compressor 10 flows into the heat medium relay unit 3 without passing through the heat source side heat exchanger 12 in the outdoor unit 1. In the heat medium relay unit 3, the pump 21a and the pump 21b are driven, the heat medium flow control device 25a and the heat medium flow control device 25b are opened, and the heat medium flow control device 25c and the heat medium flow control device 25d are totally closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant circuit A will be described.

A low-temperature low-pressure refrigerant (point A of FIG. 7) is compressed by the compressor 10 and is discharged therefrom as a high-temperature high-pressure refrigerant in a supercritical state (point B of FIG. 7). The high-temperature high-pressure refrigerant in the supercritical state that has been discharged from the compressor 10 passes through the first refrigerant flow switching device 11, flows through the first connecting piping 4a, passes through the check valve 13b, and flows out of the outdoor unit 1. The high-temperature high-pressure refrigerant in the supercritical state that has flowed out of the outdoor unit 1 passes through the refrigerant piping 4 and flows into the heat medium relay unit 3. The high-temperature high-pressure refrigerant in the supercritical state that has flowed into the heat medium relay unit 3 is branched after flowing through the bypass piping 4d that bypasses the heat exchangers related to heat medium, passes through each of the second refrigerant flow switching device 18a and the second refrigerant flow switching device 18b, and flows into the corresponding one of the heat exchanger related to heat medium 15a and the heat exchanger related to heat medium 15b.

The high-temperature high-pressure refrigerant in the supercritical state that has flowed into the heat exchanger related to heat medium 15a and the heat exchanger related to heat medium 15b transfers heat in the heat exchanger related to heat medium 15a and the heat exchanger related to heat medium 15b each functioning as a gas cooler to the heat medium circulating in the heat medium circuit B, is cooled, and is turned into a middle-temperature high pressure refrigerant in a supercritical state (point C of FIG. 7). Since the refrigerant in the gas cooler is in a supercritical state that is above the critical point, the refrigerant changes its temperature while transmitting in the supercritical state, which is neither gas nor liquid. The middle-temperature high pressure refrigerant in a supercritical state flowing out of the heat exchanger related to heat medium 15a and the heat exchanger related to heat medium 15b are expanded into a low-temperature low-pressure, two-phase refrigerant in the expansion device 16a and the expansion device 16b (point D of FIG. 7). This two-phase refrigerant passes through the on-off device 17b, flows out of the heat medium relay unit 3, passes through the refrigerant piping 4, and again flows into the outdoor unit 1. The refrigerant that has flowed into the outdoor unit 1 flows through the second connecting piping 4b, passes through the check valve 13c, and flows into the heat source side heat exchanger 12 functioning as an evaporator.

Then, the refrigerant that has flowed into the heat source side heat exchanger 12 removes heat from the outdoor air in the heat source side heat exchanger 12 and thus turns into a low-temperature low-pressure gas refrigerant (point A of FIG. 7). The low-temperature low-pressure gas refrigerant flowing out of the heat source side heat exchanger 12 passes through the first refrigerant flow switching device 11 and the accumulator 19 and is sucked into the compressor 10 again.

At that time, the opening degree of the expansion device 16a is controlled such that subcool (degree of subcooling, SC of FIG. 7) is constant, in which the subcool is obtained as the difference between the value indicating a pseudo-saturation temperature (Tcc of FIG. 7) converted from a pressure detected by the pressure sensor 36 and a temperature detected by the third temperature sensor 35b (Tco of FIG. 7). In the gas cooler, since the refrigerant is in a supercritical state and does not turn into a two-phase state, there is no saturation temperature. Instead, a pseudo-saturation temperature is defined to each pressure and is used as an alternative for the saturation temperature. Details of the pseudo-saturation temperature will be described later. Similarly, the opening degree of the expansion device 16b is controlled such that subcool is constant, in which the subcool is obtained as the difference between the value indicating a pseudo-saturation temperature converted from the pressure detected by the pressure sensor 36 and a temperature detected by the third temperature sensor 35d. In addition, the on-off device 17a is closed and the on-off device 17b is opened. Note that when a temperature at the middle position of the heat exchangers related to heat medium 15 can be measured, the temperature at the middle position may be used instead of the pressure sensor 36. Accordingly, the system can be constructed inexpensively.

Further, at this time, the pseudo-condensation temperature is obtained using a gas cooler inlet temperature Tci detected by the third temperature sensors 35a or 35c serving as inlet temperature sensors and a gas cooler outlet temperature Tco detected by the third temperature sensors 35b or 35c serving as outlet temperature sensors. The rotation speed of the compressor 10 and/or the rotation speed of the pumps 21a and 21b serving as heat medium sending devices is/are controlled such that this pseudo-condensation temperature becomes a target value. Details of the pseudo-condensation temperature will be described later.

Next, the flow of the heat medium in the heat medium circuit B will be described.

In the heating only operation mode, both of the heat exchanger related to heat medium 15a and the heat exchanger related to heat medium 15b transfer heating energy of the heat source side refrigerant to the heat medium, and the pump 21a and the pump 21b allow the heated heat medium to flow through the pipings 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b. Then the heat medium transfers heat to the indoor air in the use side heat exchanger 26a and the use side heat exchanger 26b, thus heats the indoor space 7.

Then, the heat medium flows out of the use side heat exchanger 26a and the use side heat exchanger 26b and flows into the heat medium flow control device 25a and the heat medium flow control device 25b, respectively. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has flowed out of the heat medium flow control device 25a and the heat medium flow control device 25b, passes through the first heat medium flow switching device 22a and the first heat medium flow switching device 22b, respectively, flows into the heat exchanger related to heat medium 15a and the heat exchanger related to heat medium 15b, and is again sucked into the pump 21a and the pump 21b.

Note that in the pipings 5 of each use side heat exchanger 26, the heat medium is directed to flow from the second heat medium flow switching device 23 through the heat medium flow control device 25 to the first heat medium flow switching device 22. The air conditioning load required in the indoor space 7 can be satisfied by controlling the difference between a temperature detected by the first temperature sensor 31a or a temperature detected by the first temperature sensor 31b and a temperature detected by the second temperature sensor 34 so that difference is maintained at a target value. As regards a temperature at the outlet of each heat exchanger related to heat medium 15, either the temperature detected by the first temperature sensor 31a or that detected by the first temperature sensor 31b may be used. Alternatively, the mean temperature of the two may be used.

At this time, the opening degree of each of the first heat medium flow switching devices 22 and the second heat medium flow switching devices 23 are set to a medium degree such that passages to both of the heat exchanger related to heat medium 15a and the heat exchanger related to heat medium 15b are established. Although the use side heat exchanger 26a should essentially be controlled on the basis of the difference between a temperature at its inlet and that at its outlet, since the temperature of the heat medium on the inlet side of the use side heat exchanger 26 is substantially the same as that detected by the first temperature sensor 31b, the use of the first temperature sensor 31b can reduce the number of temperature sensors, so that the system can be constructed inexpensively.

Upon carrying out the heating only operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 4, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Cooling Main Operation Mode]

Figure 5:
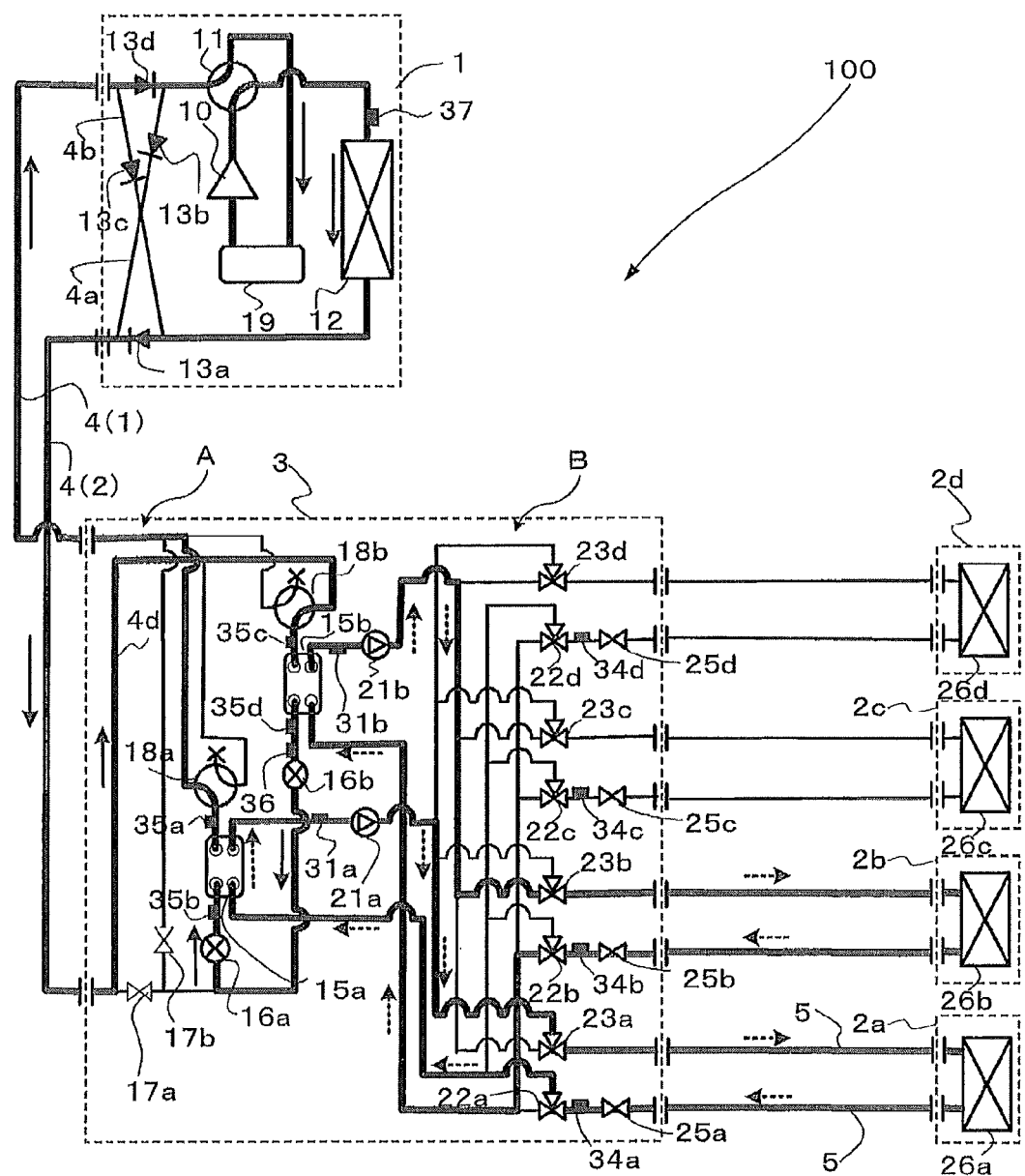
FIG. 5 is a refrigerant circuit diagram illustrating flows of refrigerants in a cooling main operation mode of the air-conditioning apparatus according to Embodiment of the invention.

FIG. 5 is a refrigerant circuit diagram illustrating the flows of the refrigerants in the cooling main operation mode of the air-conditioning apparatus 100. The cooling main operation mode will be described with respect to a case in which a cooling load is generated in the use side heat exchanger 26a and a heating load is generated in the use side heat exchanger 26b in FIG. 5. Furthermore, in FIG. 5, pipings indicated by thick lines correspond to pipings through which the refrigerants (the heat source side refrigerant and the heat medium) circulate. In addition, the direction of flow of the heat source side refrigerant is indicated by solid-line arrows and the direction of flow of the heat medium is indicated by broken-line arrows in FIG. 5.

In the cooling main operation mode illustrated in FIG. 5, the first refrigerant flow switching device 11 is switched such that the heat source side refrigerant discharged from the compressor 10 flows into the heat source side heat exchanger 12 in the outdoor unit 1. In the heat medium relay unit 3, the pump 21a and the pump 21b are driven, the heat medium flow control device 25a and the heat medium flow control device 25b are opened, and the heat medium flow control device 25c and the heat medium flow control device 25d are totally closed such that the heat medium circulates between the heat exchanger related to heat medium 15a and the use side heat exchanger 26a, and between the heat exchanger related to heat medium 15b and the use side heat exchanger 26b.

First, the flow of the heat source side refrigerant in the refrigerant circuit A will be described.

A low-temperature low-pressure refrigerant (point A of FIG. 7) is compressed by the compressor 10 and is discharged therefrom as a high-temperature high-pressure refrigerant in a supercritical state (point B of FIG. 7). The high-temperature high-pressure refrigerant in a supercritical state discharged from the compressor 10 flows through the first refrigerant flow switching device 11 into the heat source side heat exchanger 12. Here, the heat source side heat exchanger 12 functions as a gas cooler and the refrigerant is cooled while transferring heat to the outdoor air, flows out of the heat source side heat exchanger 12, passes through the check valve 13a, flows out of the outdoor unit 1, passes through the refrigerant piping 4 and flows into the heat medium relay unit 3. The high-temperature high-pressure refrigerant in the supercritical state that has flowed into the heat medium relay unit 3 passes through the bypass piping 4d that bypasses the heat exchangers related to heat medium, flows through the second refrigerant flow switching device 18b, and flows into the heat exchanger related to heat medium 15b, functioning as a gas cooler.

The high-temperature high-pressure refrigerant in the supercritical state that has flowed into the heat medium heat exchanger 15b is cooled while transferring heat to the heat medium circulating in the heat medium circuit B, and turns into a middle-temperature high pressure refrigerant in a supercritical state (point C of FIG. 7). The middle-temperature high pressure refrigerant in a supercritical state flowing out of the heat exchanger related to heat medium 15b is expanded into a low-pressure two-phase refrigerant (point D of FIG. 7) by the expansion device 16b. This low-pressure two-phase refrigerant flows through the expansion device 16a and into the heat exchanger related to heat medium 15a functioning as an evaporator. The low-pressure two-phase refrigerant that has flowed into the heat exchanger related to heat medium 15a removes heat from the heat medium circulating in the heat medium circuit B, cools the heat medium, and turns into a low-pressure gas refrigerant (point A of FIG. 7). The gas refrigerant flows out of the heat exchanger related to heat medium 15a, passes through the second refrigerant flow switching device 18a, flows out of the heat medium relay unit 3, and flows into the outdoor unit 1 again through the refrigerant piping 4. The refrigerant that has flowed into the outdoor unit 1 passes through the check valve 13d, the first refrigerant flow switching device 11, and the accumulator 19, and is again sucked into the compressor 10.

At this time, the opening degree of the expansion device 16b is controlled such that superheat is constant, the superheat being obtained as the difference between a temperature detected by the third temperature sensor 35a and that detected by the third temperature sensor 35b. In addition, the expansion device 16a is fully opened, the on-off device 17a is closed, and the on-off device 17b is closed. Note that the opening degree of the expansion device 16b may be controlled such that subcool (degree of subcooling, SC of FIG. 7) is constant, in which the subcool is obtained as the difference between the value indicating a pseudo-saturation temperature (Tcc of FIG. 7) converted from a pressure detected by the pressure sensor 36 and a temperature detected by the third temperature sensor 35d (Tco of FIG. 7). Alternatively, the expansion device 16b may be fully opened and the expansion device 16a may control the superheat or the subcool.

Further, at this time, the pseudo-condensation temperature is obtained using a gas cooler inlet temperature Tci detected by the fourth temperature sensor 37 serving as an inlet temperature sensor and a gas cooler outlet temperature Tco detected by the third temperature sensor 35d serving as an outlet temperature sensor. The rotation speed of the compressor 10 and/or the rotation speed of the fan, serving as a heat medium sending device, attached to the heat source side heat exchanger 12 and the pump 21b is/are controlled such that this pseudo-condensation temperature becomes a target value. Details of the pseudo-condensation temperature will be described later.

Next, the flow of the heat medium in the heat medium circuit B will be described.

In the cooling main operation mode, the heat exchanger related to heat medium 15b transfers heating energy of the heat source side refrigerant to the heat medium, and the pump 21b allows the heated heat medium to flow through the pipings 5. Furthermore, in the cooling main operation mode, the heat exchanger related to heat medium 15a transfers cooling energy of the heat source side refrigerant to the heat medium, and the pump 21a allows the cooled heat medium to flow through the pipings 5. The heat medium that has flowed out of each of the pump 21a and the pump 21b while being pressurized flows through the corresponding second heat medium flow switching device 23a and second heat medium flow switching device 23b into the corresponding use side heat exchanger 26a and the use side heat exchanger 26b.

In the use side heat exchanger 26b, the heat medium transfers heat to the indoor air, thus heats the indoor space 7. In addition, in the use side heat exchanger 26a, the heat medium removes heat from the indoor air, thus cools the indoor space 7. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has passed through the use side heat exchanger 26b with a slight decrease of temperature, passes through the heat medium flow control device 25b and the first heat medium flow switching device 22b, flows into the heat exchanger related to heat medium 15b, and is sucked into the pump 21b again. The heat medium, which has passed through the use side heat exchanger 26a with a slight increase of temperature, passes through the heat medium flow control device 25a and the first heat medium flow switching device 22a, flows into the heat exchanger related to heat medium 15a, and is then sucked into the pump 21a again.

During this time, the function of the first heat medium flow switching devices 22 and the second heat medium flow switching devices 23 allow the heated heat medium and the cooled heat medium to be introduced into the respective use side heat exchangers 26 having a heating load and a cooling load, without being mixed. Note that in the pipings 5 of each of the use side heat exchanger 26 for heating and that for cooling, the heat medium is directed to flow from the second heat medium flow switching device 23 through the heat medium flow control device 25 to the first heat medium flow switching device 22. Furthermore, the difference between the temperature detected by the first temperature sensor 31b and that detected by the second temperature sensor 34 is controlled such that the difference is kept at a target value, so that the heating air conditioning load required in the indoor space 7 can be covered. The difference between the temperature detected by the second temperature sensor 34 and that detected by the first temperature sensor 31a is controlled such that the difference is kept at a target value, so that the cooling air conditioning load required in the indoor space 7 can be covered.

Upon carrying out the cooling main operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 5, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Heating Main Operation Mode]

Figure 6:
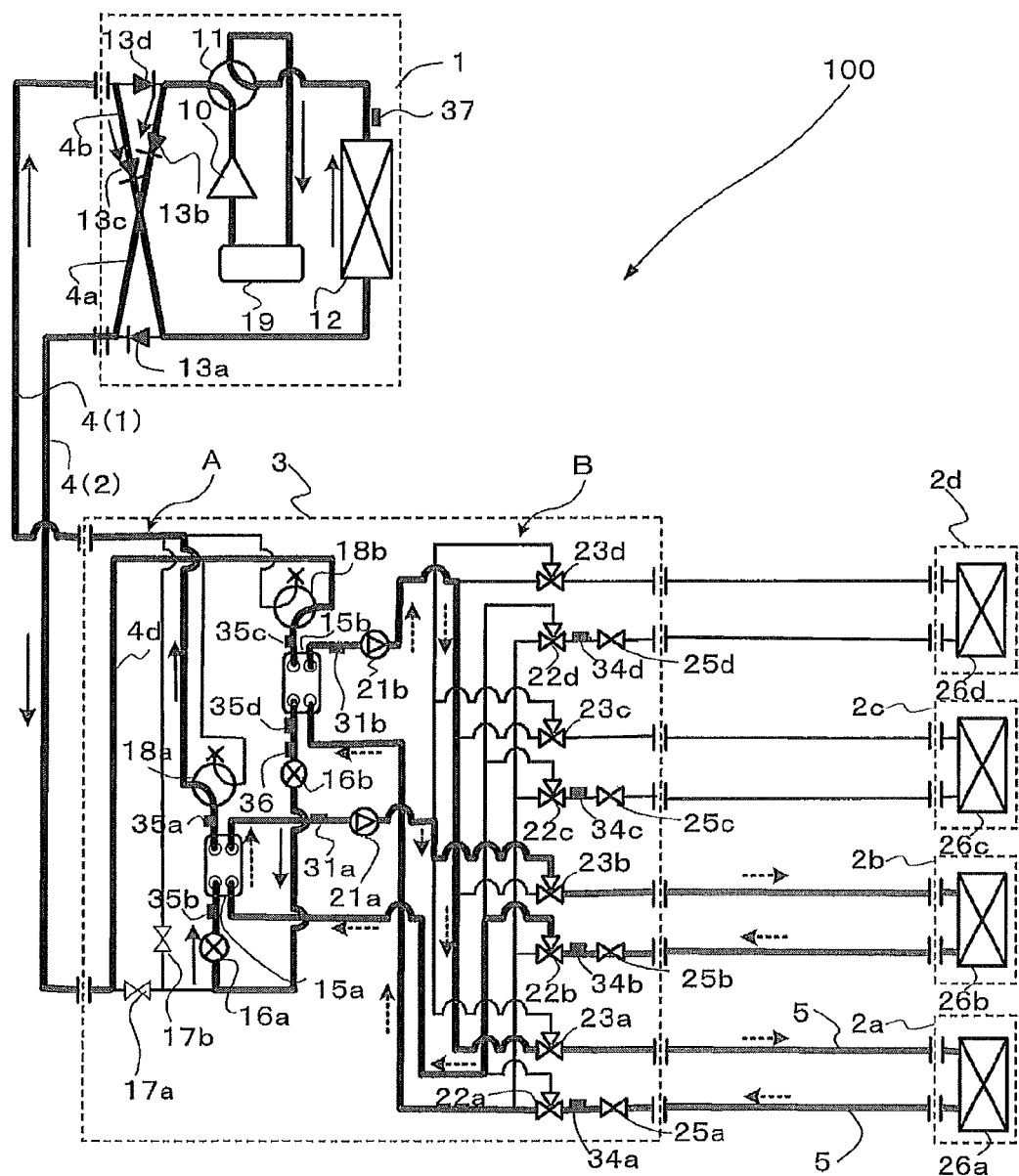
FIG. 6 is a refrigerant circuit diagram illustrating flows of refrigerants in a heating main operation mode of the air-conditioning apparatus according to Embodiment of the invention.

FIG. 6 is a refrigerant circuit diagram illustrating the flows of the refrigerants in the heating main operation mode of the air-conditioning apparatus 100. The heating main operation mode will be described with respect to a case in which a heating load is generated in the use side heat exchanger 26a and a cooling load is generated in the use side heat exchanger 26b in FIG. 6. Furthermore, in FIG. 6, pipings indicated by thick lines correspond to pipings through which the refrigerants (the heat source side refrigerant and the heat medium) circulate. In addition, the direction of flow of the heat source side refrigerant is indicated by solid-line arrows and the direction of flow of the heat medium is indicated by broken-line arrows in FIG. 6.

In the heating main operation mode illustrated in FIG. 6, in the outdoor unit 1, the first refrigerant flow switching device 11 is switched such that the heat source side refrigerant discharged from the compressor 10 flows into the heat medium relay unit 3 without passing through the heat source side heat exchanger 12. In the heat medium relay unit 3, the pump 21a and the pump 21b are driven, the heat medium flow control device 25a and the heat medium flow control device 25b are opened, and the heat medium flow control device 25c and the heat medium flow control device 25d are totally closed such that the heat medium circulates between each of the heat exchanger related to heat medium 15a and the heat exchanger related to heat medium 15b and each of the use side heat exchanger 26a and the use side heat exchanger 26b.

First, the flow of the heat source side refrigerant in the refrigerant circuit A will be described.

A low-temperature low-pressure refrigerant (point A of FIG. 7) is compressed by the compressor 10 and is discharged therefrom as a high-temperature high-pressure refrigerant in a supercritical state (point B of FIG. 7). The high-temperature high-pressure refrigerant in the supercritical state that has been discharged from the compressor 10 passes through the first refrigerant flow switching device 11, flows through the first connecting piping 4a, passes through the check valve 13b, and flows out of the outdoor unit 1. The high-temperature high-pressure refrigerant in the supercritical state that has flowed out of the outdoor unit 1 passes through the refrigerant piping 4 and flows into the heat medium relay unit 3. The high-temperature high-pressure refrigerant in the supercritical state that has flowed into the heat medium relay unit 3 passes through the bypass piping 4d that bypasses the heat exchangers related to heat medium, flows through the second refrigerant flow switching device 18b, and flows into the heat exchanger related to heat medium 15b, functioning as a gas cooler.

The high-temperature high-pressure refrigerant in the supercritical state that has flowed into the heat medium heat exchanger 15b is cooled while transferring heat to the heat medium circulating in the heat medium circuit B, and turns into a middle-temperature high pressure refrigerant in a supercritical state (point C of FIG. 7). The middle-temperature high pressure refrigerant in a supercritical state flowing out of the heat exchanger related to heat medium 15b is expanded into a low-pressure two-phase refrigerant (point D of FIG. 7) by the expansion device 16b. This low-pressure two-phase refrigerant flows through the expansion device 16a and into the heat exchanger related to heat medium 15a functioning as an evaporator. The low-pressure two-phase refrigerant that has flowed into the heat exchanger related to heat medium 15a removes heat from the heat medium circulating in the heat medium circuit B, is evaporated, and cools the heat medium. This low-pressure two-phase refrigerant flows out of the heat exchanger related to heat medium 15a, passes through the second refrigerant flow switching device 18a, flows out of the heat medium relay unit 3, passes through the refrigerant piping 4, and again flows into the outdoor unit 1.

The refrigerant that has flowed into the outdoor unit 1 passes through the check valve 13c and flows into the heat source side heat exchanger 12 functioning as an evaporator. Then, the refrigerant that has flowed into the heat source side heat exchanger 12 removes heat from the outdoor air in the heat source side heat exchanger 12 and thus turns into a low-temperature low-pressure gas refrigerant (point A of FIG. 7). The low-temperature low-pressure gas refrigerant flowing out of the heat source side heat exchanger 12 passes through the first refrigerant flow switching device 11 and the accumulator 19 and is sucked into the compressor 10 again.

At that time, the opening degree of the expansion device 16b is controlled such that subcool (SC of FIG. 7) is constant, in which the subcool is obtained as the difference between the value indicating a pseudo-saturation temperature (Tcc of FIG. 7) converted from a pressure detected by the pressure sensor 36 and a temperature detected by the third temperature sensor 35b (Tco of FIG. 7). In the gas cooler, since the refrigerant is in a supercritical state and does not turn into a two-phase state, there is no saturation temperature. Instead, a pseudo-saturation temperature is defined to each pressure and is used as an alternative for the saturation temperature. Details of the pseudo-saturation temperature will be described later. In addition, the expansion device 16a is fully opened, the on-off device 17a is closed, and the on-off device 17b is closed. Alternatively, the expansion device 16b may be fully opened and the expansion device 16a may control the subcool.

Further, at this time, the pseudo-condensation temperature is obtained using a gas cooler inlet temperature Tci detected by the third temperature sensor 35c serving as an inlet temperature sensor and a gas cooler outlet temperature Tco detected by the third temperature sensor 35d serving as an outlet temperature sensor. The rotation speed of the compressor 10 and/or the rotation speed of the pump 21a serving as a heat medium sending device is/are controlled such that this pseudo-condensation temperature becomes a target value. Details of the pseudo-condensation temperature will be described later.

Next, the flow of the heat medium in the heat medium circuit B will be described.

In the heating main operation mode, the heat exchanger related to heat medium 15b transfers heating energy of the heat source side refrigerant to the heat medium, and the pump 21b allows the heated heat medium to flow through the pipings 5. Furthermore, in the heating main operation mode, the heat exchanger related to heat medium 15a transfers cooling energy of the heat source side refrigerant to the heat medium, and the pump 21a allows the cooled heat medium to flow through the pipings 5. The heat medium, which has flowed out of each of the pump 21a and the pump 21b while being pressurized, flows through the second heat medium flow switching device 23a and the second heat medium flow switching device 23b into the use side heat exchanger 26a and the use side heat exchanger 26b.

In the use side heat exchanger 26b, the heat medium removes heat from the indoor air, thus cools the indoor space 7. In addition, in the use side heat exchanger 26a, the heat medium transfers heat to the indoor air, thus heats the indoor space 7. At this time, the function of each of the heat medium flow control device 25a and the heat medium flow control device 25b allows the heat medium to flow into the corresponding one of the use side heat exchanger 26a and the use side heat exchanger 26b while controlling the heat medium to a flow rate sufficient to cover an air conditioning load required in the indoor space. The heat medium, which has passed through the use side heat exchanger 26b with a slight increase of temperature, passes through the heat medium flow control device 25b and the first heat medium flow switching device 22b, flows into the heat exchanger related to heat medium 15a, and is sucked into the pump 21a again. The heat medium, which has passed through the use side heat exchanger 26a with a slight decrease of temperature, passes through the heat medium flow control device 25a and the first heat medium flow switching device 22a, flows into the heat exchanger related to heat medium 15b, and is then sucked into the pump 21b again.

During this time, the function of the first heat medium flow switching devices 22 and the second heat medium flow switching devices 23 allow the heated heat medium and the cooled heat medium to be introduced into the respective use side heat exchangers 26 having a heating load and a cooling load, without being mixed. Note that in the pipings 5 of each of the use side heat exchanger 26 for heating and that for cooling, the heat medium is directed to flow from the second heat medium flow switching device 23 through the heat medium flow control device 25 to the first heat medium flow switching device 22. Furthermore, the difference between the temperature detected by the first temperature sensor 31b and that detected by the second temperature sensor 34 is controlled such that the difference is kept at a target value, so that the heating air conditioning load required in the indoor space 7 can be covered. The difference between the temperature detected by the second temperature sensor 34 and that detected by the first temperature sensor 31a is controlled such that the difference is kept at a target value, so that the cooling air conditioning load required in the indoor space 7 can be covered.

Upon carrying out the heating main operation mode, since it is unnecessary to supply the heat medium to each use side heat exchanger 26 having no heat load (including thermo-off), the passage is closed by the corresponding heat medium flow control device 25 such that the heat medium does not flow into the corresponding use side heat exchanger 26. In FIG. 6, the heat medium is supplied to the use side heat exchanger 26a and the use side heat exchanger 26b because these use side heat exchangers have heat loads. The use side heat exchanger 26c and the use side heat exchanger 26d have no heat load and the corresponding heat medium flow control devices 25c and 25d are totally closed. When a heat load is generated in the use side heat exchanger 26c or the use side heat exchanger 26d, the heat medium flow control device 25c or the heat medium flow control device 25d may be opened such that the heat medium is circulated.

[Representative Point in the Supercritical State]

The pseudo-saturation temperature and the pseudo-condensation temperature will be described with reference to the P-h diagram (pressure-enthalpy diagram) of carbon dioxide of FIG. 7. When the pressure is lower than the critical pressure, the refrigerant will be in a subcritical state and will change phases, such as gas, two-phase, and liquid, based on the enthalpy. A process in which the gas refrigerant is cooled while in a subcritical state, that is, a process in which the enthalpy drops will be discussed. The gas refrigerant reduces its temperature while being cooled, reaches the saturated gas line, and subsequently turns into a two-phase state. As regards the refrigerant in a two-phase state, when under a constant pressure state, even if the enthalpy changes, the refrigerant temperature does not change and the ratio of liquid increases. Further, upon reaching the saturated liquid line, the refrigerant turns into a liquid state, and with the decrease of enthalpy, the temperature of the liquid refrigerant drops. When the refrigerant in the heat exchanger is in a subcritical state, majority of the area is occupied by a two-phase state. In case of a condenser, this condensing temperature of the refrigerant in the two-phase state will be the representative temperature for controlling the subcool (degree of subcooling) of the outlet of the heat exchanger. That is, the temperature difference between the condensing temperature and the refrigerant temperature at the outlet of the condenser will be the subcool, and the opening degree of the expansion device will be controlled so that the subcool becomes the target value. Thus, the condenser is controlled so as to be in a state with high heat exchange performance (COP). When there is excessive increase in the amount of liquid refrigerant in the heat exchanger, although the heating capacity increases, the input to the compressor also increases, thus COP is deteriorated. When there is insufficient amount of liquid refrigerant in the heat exchanger, the amount of heat exchange in the condenser drops, as well as drop in the amount of heat exchange in the evaporator, and the rotation speed of the compressor is increased in order to keep the heat exchange capacity, thus deteriorating COP. That is, by controlling the condensing temperature in the heat exchanger to an optimum value, COP can be maintained at a high level. For example, as in the following equation (1), an amount of change ($\Delta N$) in the opening degree of the expansion device is determined by multiplying a deviation between a target value of the subcool ($SC_M$) and the current subcool (SC) to a coefficient $k_{SC}$, and, accordingly, control of the expansion device is carried out.

$$\Delta N = k_{SC} \times (SC_M - SC) \tag{1}$$

Further, as a heat exchanger, the representative temperature in the heat exchanger needs to be kept at a constant temperature to maintain the prescribed heating capacity. Although pressure differs depending on the type of refrigerant, if the temperature in the heat exchanger is kept constant, sufficient heat exchange capacity can be maintained by obtaining the temperature difference with a fluid around the heat exchanger, such as air. Similarity, when in a subcritical state, the condensing temperature that is a temperature of the two-phase refrigerant occupying majority of the heat exchanger is set as the representative temperature, and control may be carried out such that the condensing temperature reaches the target value. For example, as in the following equation (2), an amount of change ($\Delta F$) in the rotation speed of the compressor is determined by multiplying a deviation between the current condensing temperature (TC) and a target value of the condensing temperature ($TC_M$) to a coefficient $k_{TC}$, and, accordingly, control of the rotation speed of the compressor is carried out.

$$\Delta F = k_{TC} \times (TC - TC_M) \tag{2}$$

Note that control of the condensing temperature may be carried out by controlling the rotation speed of the compressor or by controlling the rotation speed of the heat medium sending device such as a fan attached to the condenser, or may be carried out by combining the control of the rotation speed of the compressor and the control of the rotation speed of the heat medium sending device such as a fan attached to the condenser, or may be carried out by other methods. Further, the calculation of the amount of control does not have to be performed by the above method, and control may be carried out with any calculating method.

That is, in a subcritical state, the condensing temperature is used both for the representative temperature in the heat exchanger that is used in the control of subcool to control COP at a high state and for the representative temperature in the heat exchanger that is used in the control of the rotation speed of the compressor and/or the fan to keep the heating capacity to a high value.

On the other hand, when the pressure is higher than the critical pressure, the refrigerant will be in a supercritical state and will be a supercritical refrigerant that is neither gas nor liquid. As shown in FIG. 7, as regards the supercritical refrigerant, even if the enthalpy drops, the phase does not change and the temperature gradually drops at the portion right above the saturated gas line (a pressure higher than the critical pressure). Subsequently, passes through the portion right above the critical point (point E of FIG. 7) and reaches the portion right above the saturated liquid line (point C of FIG. 7) while further dropping its temperature. That is, in a supercritical state, even under a constant pressure state, since the refrigerant temperature changes constantly inside the heat source side heat exchanger 12 or the heat exchanger related to heat medium(s) 15 (hereinafter referred to as a "gas cooler") functioning as a gas cooler, the representative point, such as the condensing temperature of the refrigerant occupying majority of the heat exchanger in the subcritical state, cannot be determined so easily. Hence, the representative point of the gas cooler is determined as below.

As regards control of subcool, under the refrigerant pressure of the gas cooler, a representative point (first representative point) for the control of the subcool will be a point (point E) having the same enthalpy as that of the enthalpy hc at the critical point of the heat source side refrigerant, that is, the point right above the critical point. The temperature of this first representative point is defined as the pseudo-saturation temperature (Tcc). Further, the subcool (SC) will be, as the following equation (3), the temperature difference between the pseudo-saturation temperature (Tcc) of the first representative point (point E) and the outlet temperature Tco or the gas cooler. Furthermore, based on equation (1), the expansion device 16 is controlled so that the subcool becomes the target temperature.

$$SC=(Tcc-Tco) \quad (3)$$

As above, by performing control based on the point right above the critical point as the representative point, the quality of the inlet of the evaporator, which is the point (point D) that has been is enthalpically decompressed from the outlet of the gas cooler, can be controlled to a value of appropriate smallness. Thus, the amount of heat exchange in the evaporator can be sufficiently obtained, COP of the system can be maintained at a high level, and energy saving can be achieved.

On the other hand, as regards the refrigerant in the gas cooler, the enthalpy changes from hci, which is the enthalpy of the inlet (point B), to hco, which is the enthalpy of the outlet (point C). The amount of heat exchange (Qc) in the gas cooler is determined by, as the following equation (3), multiplying the mass flow rate (Gr) of the refrigerant to the amount of change of enthalpy (hci hco) of the refrigerant in the gas cooler.

$$Qc=Gr \times (hci-hco) \quad (4)$$

Incidentally, the enthalpy hc of the point (point E) right above the critical point is, in the gas cooler, a value close to that of the outlet enthalpy hco and is a value substantially away from that of the inlet enthalpy hci, and, thus, cannot be a representative point to secure the amount of heat exchange in the gas cooler. If the heat transfer coefficient in the gas cooler is constant, then a point that is an enthalpy in the middle of the inlet enthalpy hci and the outlet enthalpy hco may be the representative point. However, since calculation of the enthalpy requires substantial amount of calculating, the representative temperature Tc (second representative point) will be, in a simplified manner, the mean temperature of the inlet temperature Tci of the gas cooler and the outlet temperature Tco of the gas cooler. This representative temperature Tc is defined as the pseudo-condensation temperature.

$$Tc=(Tci+Tco)/2 \quad (5)$$

As above, the first representative point is used to control the expansion device 16 and, thus, control the subcool of the gas cooler. Further, the second representative point is used to control the compressor 10 and/or the heat medium sending device such as a fan attached to the gas cooler and, thus, control to maintain the amount of heat exchange in the gas cooler high is performed. As above, the first representative point (pseudo-saturation temperature) and the second representative point (pseudo-condensation temperature) are set to have different values. Accordingly, the amount of heat exchange can be maintained high while keeping high COP, and energy saving can be achieved.

Note that a line made by connecting points where the specific heat at constant pressure becomes the largest is indicated by a two-dot chain line in FIG. 7, and the temperature thereof is denoted as Tpc. The point in which the specific heat at constant pressure becomes largest in the heat exchanger is a point which requires the largest quantity of heat for the refrigerant to change the same enthalpy, and this point in which the specific heat at constant pressure becomes largest (point F of FIG. 7) may be the second representative point (pseudo-condensation temperature) for maintaining high pressure of the gas cooler. Note that this second representative point may be obtained by calculation corresponding to the used heat source side refrigerant and by using the pressure detected by the pressure sensor 36.

Further, since the point in which the specific heat at constant pressure becomes largest is, in the P-h diagram, closer to the outlet side than the inlet side of the compressor, the condenser inlet temperature Tci and the condenser outlet temperature Tco may be used to calculate a weighted mean temperature, and this may be used as the second representative point (pseudo-condensation temperature). For example, as the following equation (6), the representative temperature Tc is calculated by multiplying a weighting coefficient $\alpha$ to the condenser inlet temperature Tci and by multiplying a weighting coefficient $(1-\alpha)$ to the condenser outlet temperature Tco. In this case, $\alpha$ may be set to a value smaller than 0.5, such as 0.3.

$$Tc=\{\alpha \times Tci+(1-\alpha)Tco\}/2 \quad (6)$$

Further, the defining of the representative points in the heat exchanger needs to be changed depending on whether the refrigerant in the heat source side heat exchanger 12 or the heat exchanger related to heat medium(s) 15 is in a supercritical state or is in a subcritical state. When in a supercritical state, the representative point can be determined as above, and when in a subcritical state, the representative point to control the subcool is to be the saturation temperature (condensing temperature) of the refrigerant that turns into a two-phase state under the pressure of the condenser. Furthermore, the same or substantially the same temperature as this condensing temperature is used as the representative point to control the high pressure.

[Refrigerant Piping 4]

As described above, the air-conditioning apparatus 100 according to Embodiment has several operation modes. In these operation modes, the heat source side refrigerant flows through the refrigerant pipings 4 connecting the outdoor unit 1 and the heat medium relay unit 3.

[Piping 5]

In some operation modes carried out by the air-conditioning apparatus 100 according to Embodiment, the heat medium, such as water or antifreeze, flows through the pipings 5 connecting the heat medium relay unit 3 and the indoor units 2.

In the air-conditioning apparatus 100 according to Embodiment, in the case in which only the heating load or cooling load is generated in the use side heat exchangers 26, the corresponding first heat medium flow switching devices 22 and the corresponding second heat medium flow switching devices 23 are controlled so as to have a medium opening degree, such that the heat medium flows into both of the heat exchanger related to heat medium 15a and the heat exchanger related to heat medium 15b. Consequently, since both the heat exchanger related to heat medium 15a and the heat exchanger related to heat medium 15b can be used for the heating operation or the cooling operation, the heat transfer area can be increased, and accordingly the heating operation or the cooling operation can be efficiently performed.

In addition, in the case in which the heating load and the cooling load simultaneously occur in the use side heat exchangers 26, the first heat medium flow switching device 22 and the second heat medium flow switching device 23 corresponding to the use side heat exchanger 26 which performs the heating operation are switched to the passage connected to the heat exchanger related to heat medium 15b for heating, and the first heat medium flow switching device 22 and the second heat medium flow switching device 23 corresponding to the use side heat exchanger 26 which performs the cooling operation are switched to the passage connected to the heat exchanger related to heat medium 15a for cooling, so that the heating operation or cooling operation can be freely performed in each indoor unit 2.

Furthermore, each of the first heat medium flow switching devices 22 and the second heat medium flow switching devices 23 described in Embodiment may be any of the sort as long as they can switch passages, for example, a three-way valve capable of switching between three passages or a combination of two on-off valves and the like switching between two passages. Alternatively, components such as a stepping-motor-driven mixing valve capable of changing flow rates of three passages or electronic expansion valves capable of changing flow rates of two passages used in combination may be used as each of the first heat medium flow switching devices 22 and the second heat medium flow switching devices 23. In this case, water hammer caused when a passage is suddenly opened or closed can be prevented. Furthermore, while Embodiment has been described with respect to the case in which the heat medium flow control devices 25 each include a stepper-motor-driven two-way valve, each of the heat medium flow control devices 25 may include a control valve having three passages and the valve may be disposed with a bypass piping that bypasses the corresponding use side heat exchanger 26.

Furthermore, as regards each of the heat medium flow control device 25, a stepper-motor-driven type that is capable of controlling a flow rate in the passage may be used. Alternatively, a two-way valve or a three-way valve whose one end is closed may be used. Alternatively, as regards each of the heat medium flow control device 25, a component, such as an on-off valve, which is capable of opening or closing a two-way passage, may be used while ON and OFF operations are repeated to control an average flow rate.

Furthermore, while the case in which each second refrigerant flow switching device 18 is a four-way valve has been described, the device is not limited to this type. The device may be configured such that the refrigerant flows in the same manner using a plurality of two-way flow switching valves or three-way flow switching valves.

While the air-conditioning apparatus 100 according to Embodiment has been described with respect to the case in which the apparatus can perform the cooling and heating mixed operation, the apparatus is not limited to the case. Even in an apparatus that is configured by a single heat exchanger related to heat medium 15 and a single expansion device 16 that are connected to a plurality of parallel use side heat exchangers 26 and heat medium flow control devices 25, and even in an apparatus that is only capable of carrying out a cooling operation or a heating operation, the same advantages can be obtained.

In addition, it is needless to say that the same holds true for the case in which only a single use side heat exchanger 26 and a single heat medium flow control device 25 are connected. Moreover, it is needless to say that no problem will arise even if the heat exchanger related to heat medium 15 and the expansion device 16 acting in the same manner are arranged in plural numbers. Furthermore, while the case in which the heat medium flow control devices 25 are equipped in the heat medium relay unit 3 has been described, the arrangement is not limited to this case. Each heat medium flow control device 25 may be disposed in the indoor unit 2. The heat medium relay unit 3 and the indoor unit 2 may be constituted in different housings.

As the heat source side refrigerant, a refrigerant that transmits in a supercritical state such as carbon dioxide or a mixed refrigerant of carbon dioxide and diethyl ether can be used; however, other refrigerants that transmit in a supercritical state may be used to obtain the same advantageous effects.

As regards the heat medium, for example, brine (antifreeze), water, a mixed solution of brine and water, or a mixed solution of water and an additive with high anticorrosive effect can be used. In the air-conditioning apparatus 100, therefore, even if the heat medium leaks into the indoor space 7 through the indoor unit 2, because the heat medium used is highly safe, contribution to improvement of safety can be made.

Typically, a heat source side heat exchanger 12 and a use side heat exchanger 26 are provided with an air-sending device in which a current of air often facilitates condensation or evaporation. The structure is not limited to this case. For example, a heat exchanger, such as a panel heater, using radiation can be used as the use side heat exchanger 26 and a water-cooled heat exchanger which transfers heat using water or antifreeze can be used as the heat source side heat exchanger 12. In other words, as long as the heat exchanger is configured to be capable of transferring heat or removing heat, any type of heat exchanger can be used as each of the heat source side heat exchanger 12 and the use side heat exchanger 26. And the number of the use side heat exchanger 26 is not particularly limited.

Furthermore, Embodiment has been described with respect to the case in which the number of heat exchangers related to heat medium 15 is two. As a matter of course, the arrangement is not limited to this case. As long as the heat exchanger related to heat medium 15 is configured to be capable of cooling or/and heating the heat medium, the number of heat exchangers related to heat medium 15 arranged is not limited.

Furthermore, each of the number of pumps 21$a$ and that of pumps 21$b$ is not limited to one. A plurality of pumps having a small capacity may be used in parallel.

In addition, in this description, an exemplary air-conditioning apparatus is described in which a refrigerant is distributed in a heat source side heat exchanger 12, a heat medium such as water is distributed in a use side heat exchangers 26, and heat is exchanged between the refrigerant and the heat medium such as water in a passage midway of the heat source side heat exchanger 12 and the use side heat exchangers 26. However, not limited to the above, the air-conditioning apparatus may be a completely-direct expansion type that connects the heat source side heat exchanger 12 and the use side heat exchangers 26 by piping and that circulates the refrigerant between the heat source side heat exchanger 12 and the use side heat exchangers 26. The same advantageous effects can be obtained.

Further, not limited to air-conditioning apparatuses, the same can be applied to refrigeration apparatuses that cool foodstuff and the like by connecting to a showcase or a unit cooler, in which the same advantageous effects can be obtained.

REFERENCE SIGNS LIST 1 outdoor unit; 1B outdoor unit; 2 indoor unit; 2$a$ indoor unit; 2$b$ indoor unit; 2$c$ indoor unit; 2$d$ indoor unit; 3 heat medium relay unit; 4 refrigerant piping; 4$a$ first connecting piping; 4$b$ second connecting piping; 4$d$ bypass piping that bypasses the heat exchangers related to heat medium; 5 piping; 6 outdoor space; 7 indoor space; 8 space; 9 structure; 10 compressor; 11 first refrigerant flow switching device; 12 heat source side heat exchanger; 13$a$ check valve; 13$b$ check valve; 13$c$ check valve; 13$d$ check valve; 15 heat exchanger related to heat medium; 15$a$ heat exchanger related to heat medium; 15$b$ heat exchanger related to heat medium; 16 expansion device; 16$a$ expansion device; 16$b$ expansion device; 16$c$ expansion device; 17 on-off device; 17$a$ on-off device; 17$b$ on-off device; 18 second refrigerant flow switching device; 18$a$ second refrigerant flow switching device; 18$b$ second refrigerant flow switching device; 19 accumulator; 21 pump; 21$a$ pump; 21$b$ pump; 22 first heat medium flow switching device; 22$a$ first heat medium flow switching device; 22$b$ first heat medium flow switching device; 22$c$ first heat medium flow switching device; 22$d$ first heat medium flow switching device; 23 second heat medium flow switching device; 23$a$ second heat medium flow switching device; 23$b$ second heat medium flow switching device; 23$c$ second heat medium flow switching device; 23$d$ second heat medium flow switching device; 25 heat medium flow control device; 25$a$ heat medium flow control device; 25$b$ heat medium flow control device; 25$c$ heat medium flow control device; 25$d$ heat medium flow control device; 26 use side heat exchanger; 26$a$ use side heat exchanger; 26$b$ use side heat exchanger; 26$c$ use side heat exchanger; 26$d$ use side heat exchanger; 31 first temperature sensor; 31$a$ first temperature sensor; 31$b$ first temperature sensor; 34 second temperature sensor; 34$a$ second temperature sensor; 34$b$ second temperature sensor; 34$c$ second temperature sensor; 34$d$ second temperature sensor; 35 third temperature sensor; 35$a$ third temperature sensor; 35$b$ third temperature sensor; 35$c$ third temperature sensor; 35$d$ third temperature sensor; 36 pressure sensor; 37 fourth temperature sensor; 100 air-conditioning apparatus; A refrigerant circuit; and B heat medium circuit.

The invention claimed is:

1. A refrigeration cycle apparatus, comprising:
a refrigerant circuit connecting a compressor, a first heat exchanger, an expansion device, and a second heat exchanger by piping, the refrigerant circuit circulating a refrigerant that transmits in a supercritical state, wherein
one of the first heat exchanger and the second heat exchanger is operated as a gas cooler by making the refrigerant in a supercritical state flow therethrough,
the other one of the first heat exchanger and the second heat exchanger is operated as a evaporator by making the refrigerant in a low-pressure two-phase state flow therethrough,
the refrigeration cycle apparatus includes
a heat medium sending device that changes a flow rate of a heat medium exchanging heat with the refrigerant in the gas cooler, and
an outlet temperature sensor that is provided in any position in the passage from an outlet side of the gas cooler to the evaporator, the outlet temperature sensor detecting a temperature of the refrigerant on the outlet side of the gas cooler,
an opening degree of the expansion device is controlled on the basis of a temperature difference between a refrigerant temperature at a first representative point in which an enthalpy of the refrigerant becomes substantially the same as the enthalpy of a critical point under the refrigerant pressure in the gas cooler and a detection temperature of the outlet temperature sensor, and
a rotation speed of the compressor and/or a rotation speed of the heat medium sending device is/are controlled on the basis of a temperature at a second representative point that is a temperature different from the first representative point under the refrigerant pressure in the gas cooler.

2. The refrigeration cycle apparatus of claim 1, wherein
a temperature at the second representative point is
a temperature higher than the first representative point.

3. The refrigeration cycle apparatus of claim 1, further comprising a pressure sensor provided in any position in the passage from an outlet side of the compressor to the expansion device, the pressure sensor detecting a pressure of the refrigerant on a high-pressure side, wherein
the first representative point is
obtained by using a detection pressure of the pressure sensor.

4. The refrigeration cycle apparatus of claim 1, further comprising
an inlet temperature sensor that is provided in any position in a passage from the outlet side of the compressor to the gas cooler, the inlet temperature sensor detecting a temperature of the refrigerant on the inlet side of the gas cooler, wherein
the second representative point is
obtained by using a detection temperature of the outlet temperature sensor and the detection temperature of the inlet temperature sensor.

5. The refrigeration cycle apparatus of claim 4, wherein
a temperature at the second representative point is
a mean temperature of the detection temperature of the outlet temperature sensor and the detection temperature of the inlet temperature sensor or is a weighted mean temperature obtained by multiplying a predetermined weighting coefficient to the detection temperature of the outlet temperature sensor and the detection temperature of the inlet temperature sensor.

6. The refrigeration cycle apparatus of claim 1, wherein
a temperature at the second representative point is
a temperature in which a specific heat of the refrigerant at constant pressure is maximum under the refrigerant pressure in the gas cooler.

7. The refrigeration cycle apparatus of claim 6, further comprising a pressure sensor provided in any position in the passage from an outlet side of the compressor to the expansion device, the pressure sensor detecting a pressure of the refrigerant on a high-pressure side, wherein
the second representative point is
obtained by using a detection pressure of the pressure sensor.

8. The refrigeration cycle apparatus of claim 1, wherein the calculation methods of each of the first representative point and the second representative point are different between
a case in which the first heat exchanger or the second exchanger is operated as a gas cooler by making the refrigerant in the supercritical state with a pressure higher than a critical pressure flow therein, and
a case in which the first heat exchanger or the second exchanger is operated as a condenser by making the refrigerant in a subcritical state with a pressure lower than the critical pressure flow therein.

9. The refrigeration cycle apparatus of claim 1, wherein
when the first heat exchanger or the second exchanger is operated as a condenser by making the refrigerant in the subcritical state with a pressure lower than the critical pressure flow therein
the second representative point has
a saturation temperature of the refrigerant that turns into a two-phase state under the refrigerant pressure in the condenser, and
the first representative point has
substantially the same temperature as the temperature at the second representative point.

10. The refrigeration cycle apparatus of claim 1, further comprising a first refrigerant flow switching device that switches between a passage from the outlet side of the compressor to the first heat exchanger and a passage from the outlet of the compressor to the second heat exchanger, wherein
the first heat exchanger is housed in an outdoor unit, and the first refrigerant flow switching device is switched to switch between
a cooling operation that operates the first heat exchanger as a gas cooler by making the refrigerant in the supercritical state flow therein and that operates the second heat exchanger as an evaporator by making the refrigerant in a low-pressure two-phase state flow therein, and
a heating operation that operates the second heat exchanger as a gas cooler by making the refrigerant in the supercritical state flow therein and that operates the first heat exchanger as an evaporator by making the refrigerant in a low-pressure two-phase state flow therein.

11. The refrigeration cycle apparatus of claim 1, wherein
the first heat exchanger is housed in the outdoor unit and exchanges heat between air serving as a heat medium and the refrigerant, and
the second heat exchanger is one of a plurality of second heat exchangers, is housed in a single or a plurality of indoor units disposed in an air conditioned space, and exchanges heat between air in the air conditioned space serving as a heat medium and the refrigerant.

12. The refrigeration cycle apparatus of claim 1, further comprising a plurality of use side heat exchangers, wherein
a heat medium cycle circulating a heat medium is formed by connecting the heat medium sending device, the use side heat exchangers, and a plurality of second heat exchangers,
the first heat exchanger is housed in the outdoor unit and exchanges heat between air and the refrigerant,
the plurality of second heat exchangers exchange heat between the heat medium and the refrigerant,
the use side heat exchangers are housed in a single or a plurality of indoor units disposed in an air conditioned space, and exchange heat between the heat medium and air in the air conditioned space.

13. The refrigeration cycle apparatus of claim 12, further comprising
a second refrigerant flow switching device switching passages of the refrigerant that flow into or out of the second heat exchanger,
a first heat medium flow switching device provided on an outlet side of the use side heat exchanger, the first heat medium flow switching device switching passages between the outlet side of the use side heat exchanger and the second heat exchangers,
a second heat medium flow switching device provided on an inlet side of the use side heat exchanger, the second heat medium flow switching device switching passages between the inlet side of the use side heat exchanger and the second heat exchangers, and
a heat medium flow control device provided between the use side heat exchanger and the first heat medium flow switching device or between the use side heat exchanger and the second heat medium flow switching device, the heat medium flow control device controlling a flow rate of the heat medium circulating in the use side heat exchanger.

14. The refrigeration cycle apparatus of claim 13, wherein
the compressor, the first refrigerant flow switching device, and the first heat exchanger are housed in the outdoor unit,
at least the expansion device, the second heat exchangers, and the second refrigerant flow switching device are housed in a heat medium relay unit, and
the outdoor unit, the heat medium relay unit, and the indoor unit(s) are formed in different housings, respectively and are capable of being positioned at separate places each other.

15. The air-conditioning apparatus of claim 14, wherein the outdoor unit and the heat medium relay unit are connected with two refrigerant pipings.

16. The refrigeration cycle apparatus of claim 12, wherein the refrigeration cycle apparatus is capable of executing:
a heating only operation mode that heats the heat medium by flowing a high-temperature high-pressure refrigerant that has been discharged from the compressor into all of the second heat exchangers;

a cooling only operation mode that cools the heat medium by flowing a low-temperature low-pressure refrigerant into all of the second heat exchangers;

a cooling and heating mixed operation mode that heats the heat medium by flowing a high-temperature high-pressure refrigerant that has been discharged from the compressor into one or some of the second heat exchangers and cools the heat medium by flowing a low-temperature low-pressure refrigerant into one or some of the transmitting second heat exchangers.

\* \* \* \* \*